(12) United States Patent
Neufeld et al.

(10) Patent No.: US 6,795,894 B1
(45) Date of Patent: Sep. 21, 2004

(54) FAST DISK CACHE WRITING SYSTEM

(75) Inventors: E. David Neufeld, Tomball, TX (US); Christopher J. Frantz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 09/634,055

(22) Filed: Aug. 8, 2000

(51) Int. Cl.$^7$ .............................................. G06F 12/00
(52) U.S. Cl. ..................................................... 711/113
(58) Field of Search ........................ 711/111, 112, 113, 711/4

(56) References Cited

U.S. PATENT DOCUMENTS

| | | | |
|---|---|---|---|
| 5,101,492 A | | 3/1992 | Schultz et al. |
| 5,249,279 A | | 9/1993 | Schmenk et al. |
| 5,331,646 A | | 7/1994 | Krueger et al. |
| 5,333,305 A | | 7/1994 | Neufeld |
| 5,440,716 A | | 8/1995 | Schultz et al. |
| 5,455,926 A | * | 10/1995 | Keele et al. ................. 711/112 |
| 5,522,065 A | | 5/1996 | Neufeld |
| 5,553,307 A | * | 9/1996 | Fujii et al. ..................... 710/25 |
| 5,584,007 A | * | 12/1996 | Ballard ........................ 711/113 |
| 5,592,648 A | | 1/1997 | Schultz et al. |
| 5,600,816 A | * | 2/1997 | Oldfield et al. ............. 711/113 |
| 5,644,791 A | * | 7/1997 | Brady et al. .................. 710/68 |
| 5,661,848 A | * | 8/1997 | Bonke et al. ................. 360/48 |
| 5,668,971 A | | 9/1997 | Neufeld |
| 5,854,941 A | * | 12/1998 | Ballard et al. ................. 710/5 |
| 5,859,742 A | * | 1/1999 | Takaishi ................... 360/77.07 |
| 5,890,209 A | * | 3/1999 | Dobbek .................... 360/78.04 |
| 5,890,211 A | * | 3/1999 | Sokolov et al. ............. 711/113 |
| 6,134,063 A | * | 10/2000 | Weston-Lewis et al. ...... 360/49 |
| 6,253,279 B1 | * | 6/2001 | Ng ................................ 710/5 |
| 6,330,640 B1 | * | 12/2001 | Williams et al. .............. 710/52 |

* cited by examiner

*Primary Examiner*—Matthew D. Anderson

(57) ABSTRACT

A disk cache writing system that substantially improves disk drive caching. A cache disk drive, or a reserved portion of a standard disk drive, is provided that is dedicated to cache data. Any of the current data of the disk drive or cache portion is temporary cache data that may be overwritten at any time. Cache data is written to a write section, including one or more sequential sectors, where the write section has a minimal write access time. The write section begins at a first offset sector associated with a minimal write access time, or at any one of several potential start sectors including the first offset sector. One or more potential start sectors are determined, where each corresponds with a first start sector in a current track to avoid moving the R/W heads from the current track. The only initial delay that is encountered is the delay to switch the R/W heads from read to write. The potential start sectors are aligned within the same current cylinder of the disk drive since all the R/W heads are aligned. The only other delay(s) that may be encountered are the characteristic delays associated with writing to sequential sectors of the chosen disk drive that are otherwise unavoidable, such as delays associated with switching sequential tracks, heads, surfaces, platters, etc.

40 Claims, 15 Drawing Sheets

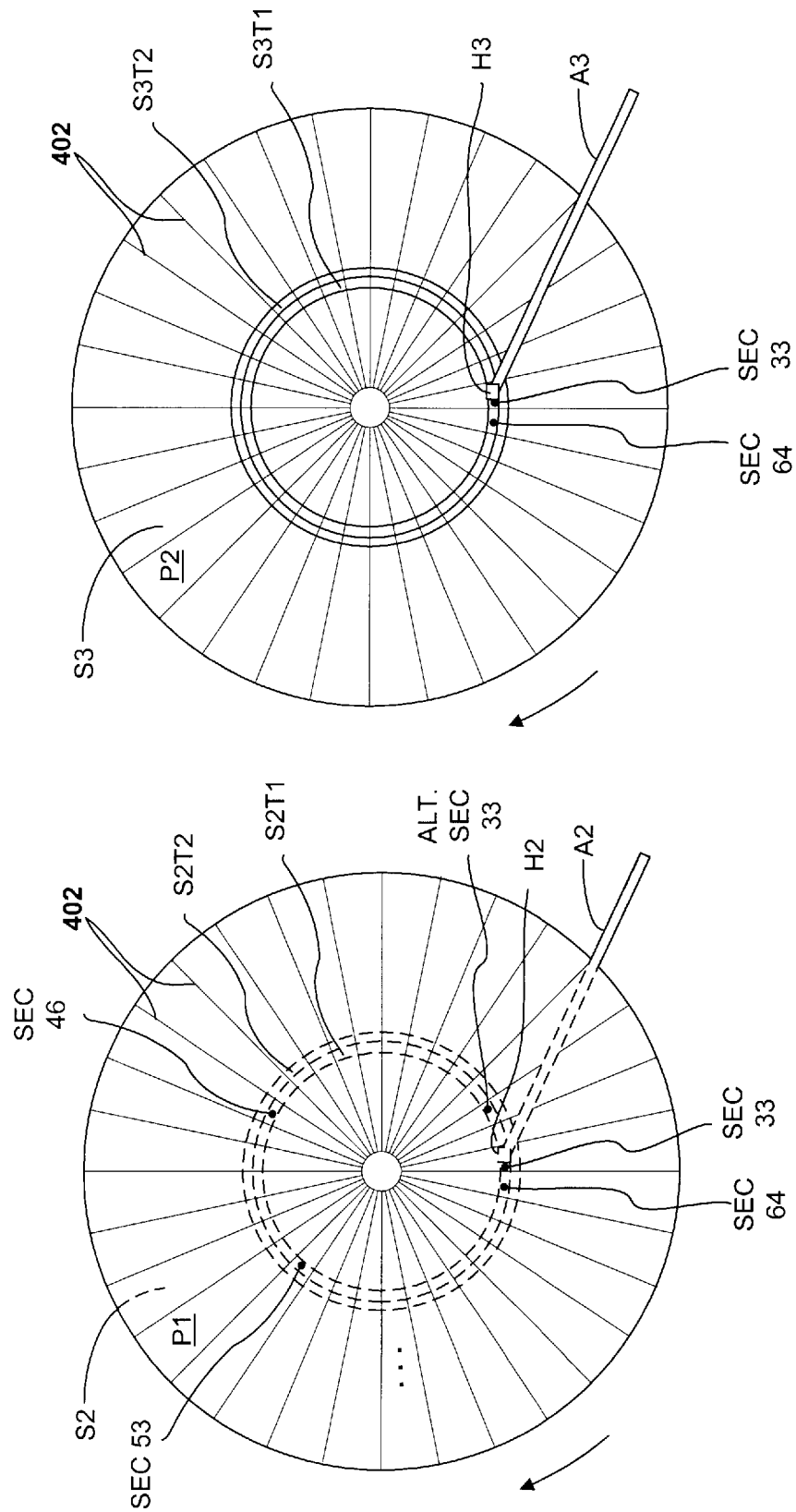

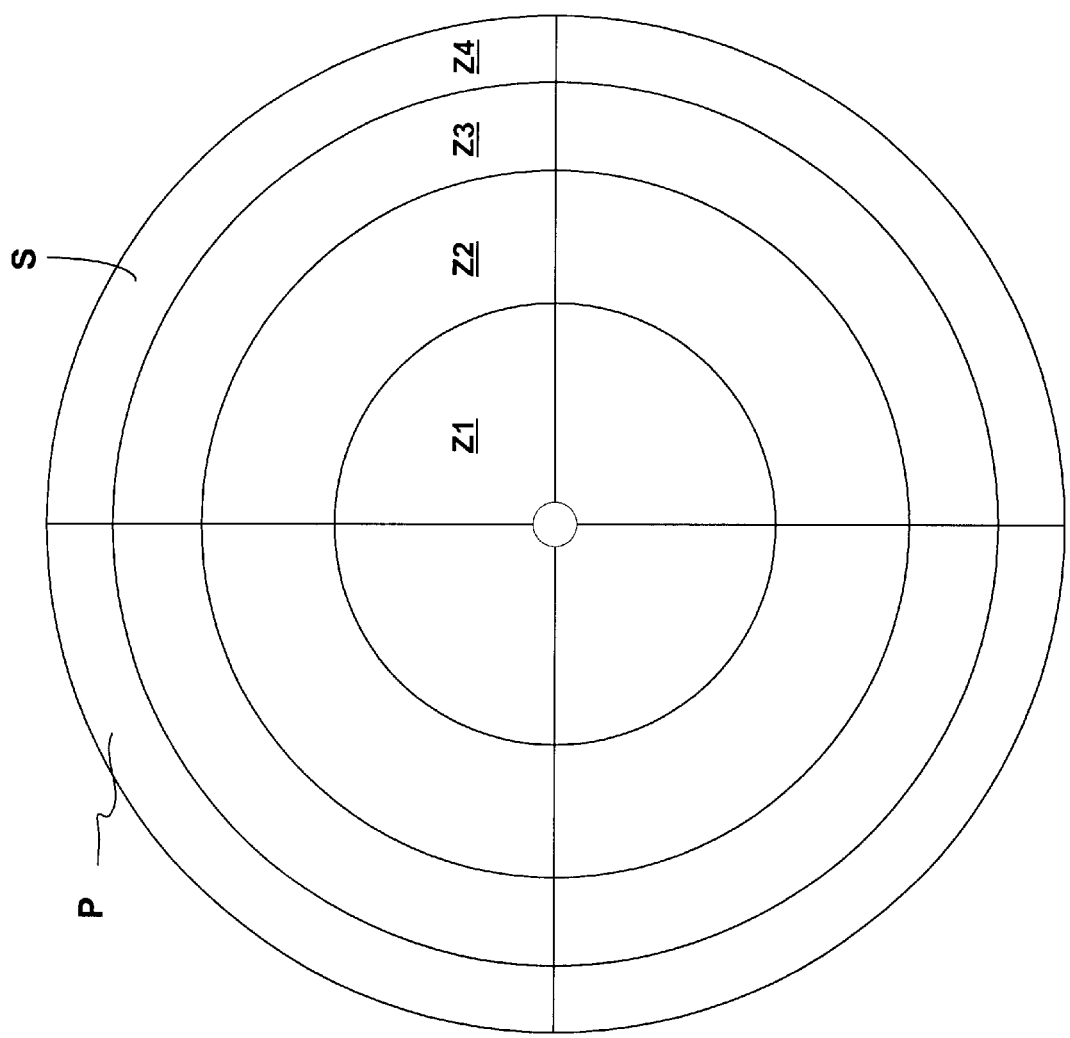

| Zone | Start | Stop | First Offset | Step Offset |
|---|---|---|---|---|
| 0 | 0 | 4250000 | 70+/-1 | 151+/-1 |
| 1 | 4250000 | 5000000 | 69+/-2 | 144+/-1 |
| 2 | 5000000 | 5550000 | 67+/-2 | 139+/-1 |
| 3 | 5550000 | 6000000 | 65+/-0 | 133+/-1 |
| 4 | 6000000 | 6500000 | 64+/-1 | 128+/-1 |
| 5 | 6500000 | 6950000 | 62+/-1 | 122+/-1 |
| 6 | 6950000 | 7250000 | 61+/-1 | 116+/-0 |
| 7 | 7250000 | 7650000 | 59+/-2 | 112+/-3 |
| 8 | 7650000 | 8050000 | 57+/-1 | 103+/-1 |
| 9 | 8050000 | 8250000 | 55+/-1 | 97+/-1 |

FIG. 11

FAST DISK CACHE WRITING SYSTEM

FIELD OF THE INVENTION

The present invention relates to disk cache systems, and more particularly to a method and apparatus for writing cache data to a disk drive and a fast and efficient manner.

DESCRIPTION OF THE RELATED ART

It is common to access and retrieve data from an external network using a computer coupled to the external network via any one of many known network connection methods. For example, the computer may be coupled to the internet via an internet server provided (ISP) or the like using a 56 K (56 kilobits per second) analog modem, a digital modem (using ISDN, ADSL, etc.), a cable modem, etc. The computer has an appropriate browser or the like for searching, accessing and retrieving the data from the internet, such as web pages from the world wide web (WWW). The present invention is not limited to the internet, and contemplates any type of external network.

The user often browses the same information during the same communication session or during a later communication session. The external network may experience delays, however, especially during periods of heavy traffic. The communication connection may also be relatively slow. Data caching techniques are often used to temporarily store retrieved data for subsequent access and perusal to avoid the delays associated with the network or the communication connections.

Data is often cached within the dynamic memory of the computer, such as within dynamic random access memory (DRAM) devices or the like commonly used for computer systems. The dynamic memory is a valuable and expensive type of memory, however, and thus is often a limited resource. Data may also be cached to the hard disk drive of the computer system. Such disk drive caching, however, has several disadvantages. Although the disk drive is relatively fast compared to the network, the disk drive is relatively slow compared to the dynamic memory. The disk drive is slow primarily because of the mechanical nature of the drive and the sequential storage of the data on the drive. The data storage and retrieval speed of the disk drive is further reduced by the associated overhead associated with the file structure of the data on the drive. To avoid overwriting any data on the drive, space for a new cache file must be allocated, and the new file must be created to store the data to be cached. When caching data, the read/write (R/W) heads must be moved to access the beginning region of the new cache file. Also, the cache file is often distributed within the disk drive in more than one region, resulting in a substantial write access time as the R/W heads access each of the several regions of the cache file to complete the write operation. Similar delays are encountered when reading cached data from such distributed cache files.

The computer may be coupled to the external network via a local area network (LAN) or the like. The LAN may further include a server computer system and a gateway device, such as a router or the like. The server may be used to cache data for several computers coupled to the LAN in a similar manner as described above for the standalone computer. Caching by the server provides the advantage of allowing any of the computers in the LAN to access cached data. Although the server may be loaded with significantly more dynamic memory, it may still be insufficient to meet the desired caching needs of the LAN. The server may utilize one or more hard disk drives to store cached data in a similar manner as described above. Such disk drive caching techniques, however, have suffered from the same disadvantages described above. It is desired to improve disk drive caching techniques.

SUMMARY OF THE INVENTION

A disk drive caching system according to one embodiment of the present invention includes a disk drive, cache write logic and disk drive logic. The cache write logic includes start sector logic that determines a plurality of start sectors including an offset sector relative to a current sector within a current track of the disk drive and at least one other sector that corresponds to the offset sector. The cache write logic further includes select logic that selects one of the plurality of start sectors. The disk drive logic controls read and write caching operations to the disk drive, which includes writing cache data to a write section beginning at a start sector selected by the select logic. In this manner, cache write operations have relatively short write access times.

The disk drive is typically divided into zones, where each zone has a different number of sectors per track. The disk drive caching system may further include an offset table that stores a predetermined sector offset and a predetermined sector step offset for each zone of the disk drive. The predetermined sector offset is associated with a minimal write access time for a corresponding zone and the predetermined sector step offset is associated with sector density of a corresponding zone. The start sector logic retrieves a sector offset and a sector step offset from the offset table for a current zone to determine the offset sector and at least one alternative start sector. In a more particular embodiment, the disk drive includes a plurality of platters and corresponding write surfaces. The start sector logic uses the retrieved sector step offset and the determined offset sector to determine a plurality of aligned sectors in aligned tracks of a current cylinder of the disk drive.

The select logic may further include timing logic that determines a total write time for each of the plurality of start sectors. The disk drive caching system may further include a write time penalty table that includes write time penalties associated with the disk drive. The select logic retrieves and adds any write time penalties from the write time penalty table for each of the plurality of start sectors. The disk drive caching system may select one of the plurality of start sectors that has a least total write time. In another embodiment, the select logic also includes priority logic that determines a priority level of data stored on the disk drive for each of the plurality of start sectors. The select logic determines a write section for each of the plurality of start sectors and the priority logic determines a priority level for each sector of each write section. The select logic assigns a priority level for each write section that is equal to the priority level of a sector having a highest relative priority level within each write section. The select logic may select a start sector associated with the lowest relative priority level. The select logic may select a start sector based on total write time or relative priority or a combination of both.

A data retrieval system for accessing data from an external network according to one embodiment of the present invention includes a local network system that enables retrieval of data from the external network, at least one computer that requests data from the external network via the local network system, and a server system that retrieves and caches data from the external network. The server system further includes a disk drive, a processor, and memory. The server system further includes code, stored in the memory and executed by the processor, for controlling disk cache operations. The code includes start sector code that determines a plurality of potential start sectors, select code that selects a start sector from the plurality of potential start sectors and disk drive code that caches retrieved data onto the disk drive at the selected start sector. The plurality of potential start sectors includes a first start sector having a minimal write access time and at least one other start sector that corresponds with the first start sector that also has a minimal write access time. The start sector code, the select code, and the disk drive code may be part of an operating system that runs on the server system.

The memory may further store a sector offset table, where the start sector code accesses the sector offset table to retrieve a sector offset and a sector step offset to determine the plurality of potential start sectors. The select code may select a start sector to store the retrieved data based on a total write time determined for each of the plurality of potential start sectors. The data retrieval system may further include write delay information stored in the memory, where the select code accesses and uses the write delay information to determine the total write time for each of the plurality of potential start sectors. In another embodiment, the select code selects a start sector based on priority of data currently stored on the disk drive beginning at each of the plurality of potential start sectors. Of course, the select code may select a start sector based on a combination of total write time associated with each write section and priority of data currently stored on the disk drive at each potential start sector.

The local network system may include a gateway device such as a router or the like. The local network system may further include a multiple port network device coupled to the gateway device, such as a hub, repeater, switch or the like. The external network may include or otherwise be coupled to the internet, where the retrieved data includes web page information from the internet, such as the world wide web (WWW).

The disk drive typically includes a plurality of cylinders, each cylinder including a plurality of corresponding tracks. A method of caching data to a disk drive in one embodiment according to the present invention includes determining an offset sector in a current track of the disk drive and determining at least one other sector in a different track of the current cylinder that corresponds to the offset sector. The offset sector and the at least one other sector form a plurality of potential start sectors. The method further includes selecting a start sector from the plurality of start sectors for a cache write operation, and writing cache data to the disk drive beginning with the selected start sector. The determining an offset sector may comprise determining a sector having a minimum write access time after a read operation. The determining an offset sector may alternatively comprise retrieving a sector offset from a table of sector offsets of the disk drive, and adding the retrieved sector offset to a current sector number to obtain an offset sector number. The determining at least one other sector my comprise retrieving one or more sector step offsets from the table of sector offsets, and adding the retrieved sector step offsets to the offset sector number. The determining at least one other sector in a different track of the current cylinder that corresponds to the offset sector may comprise determining aligned sectors in aligned tracks along the current cylinder of the disk drive.

The selecting a start sector may further include determining a total write time associated with each of the plurality of start sectors and selecting a start sector having a least total write time. Alternatively, the selecting a start sector may further include determining a priority level associated with each of the plurality of start sectors and selecting a start sector associated with a lowest priority level. Of course, the selecting a start sector from the plurality of start sectors may comprise using a combination of total write time and relative priority level of each of the plurality of start sectors. The determining a total write time may include adding any write time delays associated with each of the plurality of start sectors. Such write time delays may be determined by consulting a table of predetermined write time delays. The determining a priority level may comprise determining a plurality of write sections corresponding to the plurality of start sectors, determining a priority level of each sector within each of the plurality of write sections, and assigning a priority level to each of the plurality of write sections that is equal to the priority level of an included sector having a highest priority level. A method according to the present invention may further comprise, when the writing cache data to the disk drive, determining a priority level of the cache data to be written and storing a number corresponding to the determined priority level in a file database.

It is now appreciated that a disk cache writing system according to any one or more embodiments according to the present invention substantially improves disk drive caching techniques. A cache disk drive is provided that is dedicated to cache data. Alternatively, a portion of a standard disk drive is reserved for cache data. In this manner, any or all of the current data of the disk drive or cache portion is temporary cache data that may be overwritten at any time. The standard file allocation and storage techniques are avoided thereby substantially reducing write access times. Cache data is written to a write section, including one or more sequential sectors, where the write section has a minimal write access time. The write section begins at a first offset sector associated with a minimal write access time, or at any one of several potential start sectors including the first offset sector. The first start sector resides within the current track of the disk drive to avoid moving the R/W heads to begin the cache write operation. The only initial delay that is encountered is the delay to switch the R/W heads from read to write. On another embodiment, one or more other start sectors, corresponding with the first start sector, are also determined, where each of the other start sectors also avoid moving the R/W heads from the current track since all the R/W heads are aligned within the same current cylinder of the disk drive. The only other delay(s) that may be encountered during the cache write operation are the characteristic delays associated with writing to sequential sectors of the chosen disk drive that are otherwise unavoidable, such as delays associated with switching sequential tracks, heads, surfaces, platters, etc.

BRIEF DESCRIPTION OF THE DRAWINGS

A better understanding of the present invention can be obtained when the following detailed description of the preferred embodiment is considered in conjunction with the following drawings, in which:

FIG. 4C is a top view diagram of a second surface on the first platter of the disk drive of FIGS. 1 and 3, looking through and past the first surface, illustrating an alternative exemplary track organization and sector arrangement of the disk drive of FIG. 3.

FIG. 4D is a top view diagram of a third surface on a second platter of the disk drive of FIGS. 1 and 3, illustrating another alternative exemplary track organization and sector arrangement of the disk drive of FIGS. 1 and 3.

FIG. 5 is a simplified block diagram of the surface of an exemplary platter P of the disk drive of FIGS. 1 and 3 illustrating zone bit recording with four different zones.

FIG. 11 is table of offsets and step offsets measured for the exemplary 4.35 GB disk drive.

DETAILED DESCRIPTION OF THE PREFERRED EMBODIMENT

Figure 1:
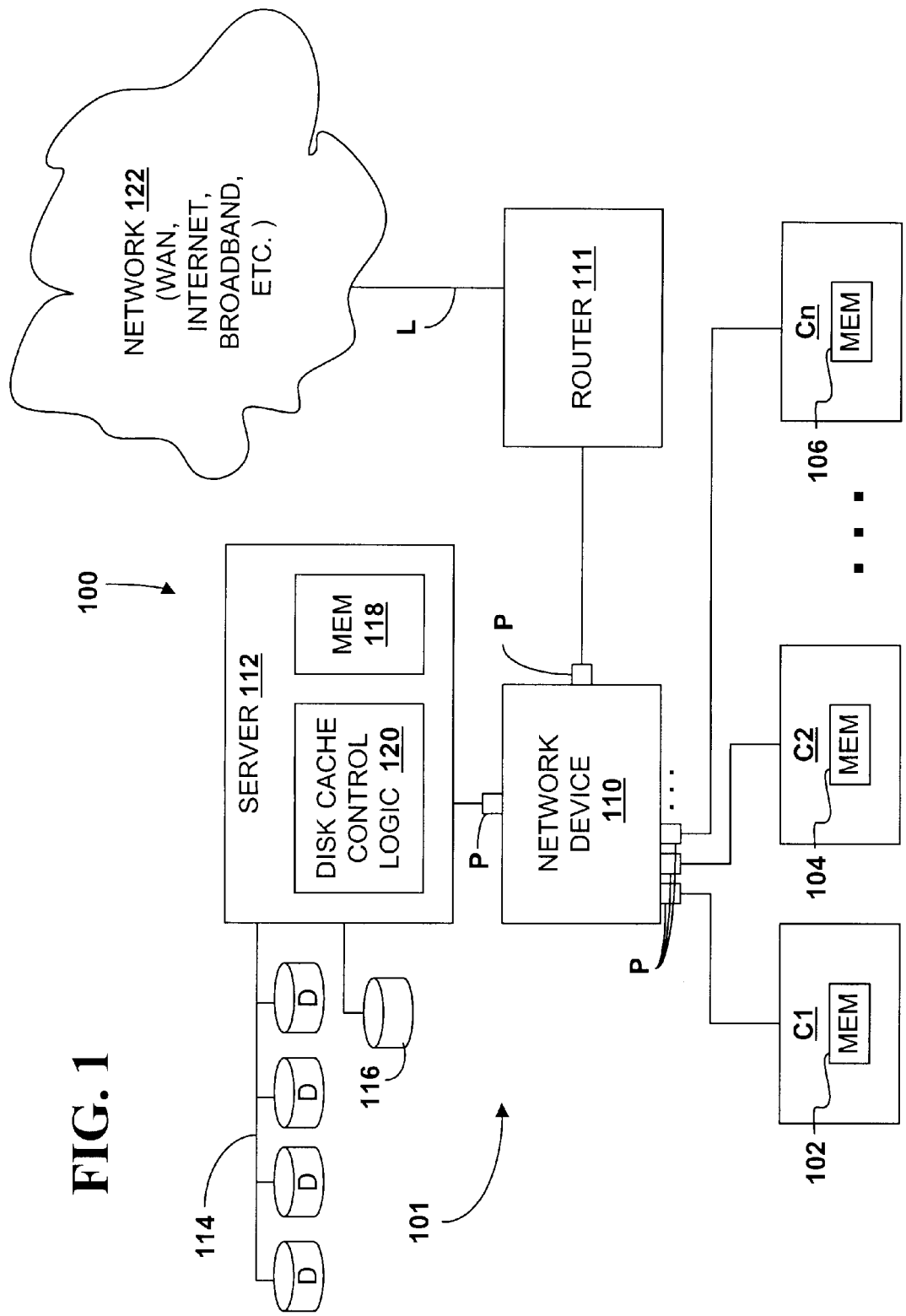
FIG. 1 is a simplified block diagram of a network system that incorporates a disk caching system according to one embodiment of the present invention.

FIG. 1 is a simplified block diagram of a network system 100 that incorporates a disk caching system according to one embodiment of the present invention. A local area network (LAN) 101 including a server system 112 has access to a network 122, such as a wide area network (WAN), a broadband network, or any other type of network, and which may include the Internet. The LAN 101 includes any desired number computer systems, individually labeled C1, C2 . . . Cn (C1–Cn), which are each coupled together in the LAN 101 via a network device 110, such as a hub, repeater, switch or the like. Each of the computer systems C1–Cn is coupled to the network device 110 via corresponding ports (P) of the network device 110. One of the ports of the network device 110, which may comprise a regular port or an uplink port, is coupled to the server system 112. Another port is coupled to a router 111 or the like, which is further coupled to the network 122 via a network link L. The network link L comprises any type of connection to external networks, such as ISDN (Integrated Digital Services Network), T1 line, T3 line, etc., and may include both wired and wireless portions. The router 111 effectively establishes a gateway to the network 122 for the LAN 101 as known to those skilled in the art.

The server system 112 may comprise any type of computer system, as further described below, which further includes a memory 118 incorporating any combination of read-only memory (ROM), random-access memory (RAM), such as dynamic RAM (DRAM) or static RAM (SRAM), as well as other types of memory devices including hard disk drives, floppy disk drives, CD ROMS, etc. Each of the computer systems C1–Cn further may include a corresponding memory or memory system (MEM) 102, 104 and 106, respectively. The server system 112 includes a disk drive system 114, which may be configured as a redundant array of inexpensive disks (RAID) comprising any number of hard disk drives (D) organized in a RAID configuration. The server system 112 further includes at least one cache disk drive 116 for purposes of caching retrieved data as further described below. Although only one disk drive is shown, the cache disk drive 116 represents any number of cache disk drives as needed or desired.

As further described below, the cache disk drive 116 may be any type of commonly available disk drives with multiple disks or platters, each with one or two write surfaces. The platters are circular disks stacked in a parallel and concentric configuration. The platters are organized into multiple tracks on each surface, where each track is further divided into sectors. Sectors are typically 512 bytes of data in standard disk drive configurations. The cache disk drive 116 further includes multiple read/write (R/W) heads, one for each surface, which generally define the tracks. Since the R/W heads are typically aligned with each other and move in unison, each track is usually aligned with corresponding tracks on other platters and organized into cylinders comprising a stack of aligned tracks. The sector density, or the number of sectors per track, may vary across the surfaces of the platters for modern disk drives. The tracks at the outer portion of the platters have a larger linear distance as compared to the inner portion, so that more sectors may be included on the outer tracks. For this reason, the tracks may further be divided into zones, as described further below with reference to FIG. 5, where each zone has a different sector density.

The server system 112 includes disk cache control logic 120, which is provided for controlling operations of the cache disk drive 116. The disk cache control logic 120 may be implemented as separate logic, or may comprise software or code loaded in the memory system 118 from the disk drive system 114 and executed by a processor or the like of the server system 112. The disk cache control logic 120 is provided to control the reading and writing of data to and from the cache disk drive 116. Generally, read and write operations are grouped together such that a disk cache writing operation is performed after one or more read operations. The present invention addresses a relatively fast and efficient way to write data to the cache disk drive 116 for any disk cache write operation and particularly after read operations have been performed.

Each of the computer systems C1–Cn includes a browser software application or the like (not shown), such as Microsoft Internet Explorer, Netscape Navigator, America Online, Inc. (AOL), etc., for searching, accessing and/or retrieving data from the network 122 via the server system 112, the router 111 and the link L. For example, a user of the computer system C1 may submit a URL (Uniform Resource Locator) via the local browser to access a web page or the like on the World Wide Web (WWW) of the Internet. The web page and associated data are downloaded to the computer system C1 via the server system 112 for local display or storage. It is common that a user accesses the same information or page from the Internet in a given session or within multiple sessions over time. Further, it is common that several of the users of the computer systems C1–Cn access the same information or page from the network 122 over a given period of time.

Each of the computer systems C1–Cn may include some sort of limited cache capability for restoring retrieved information within the respective memories 102, 104 or 106. For example, retrieved information stored within the memory 102 may be retrieved again and displayed by the computer system C1 without having to access the same information from the network 122. Such limited caching saves time and provides increased efficiency. However, the devices comprising the memories 102, 104 and 106 are relatively expensive, so that the size of these local memories and are usually limited in size and thus unable to cache a significant amount of data. Also, retrieved information within the memory 102 is generally not accessible by the other computer systems C2–Cn.

The server system 112 is configured to perform caching functions for the LAN 101. The primary level of caching function may be performed by relatively fast RAM devices (DRAM or the like) within the memory 118 for copying and storing data from the network 122. In this manner, data retrieved from the network 122 by any one of the computer systems C1–Cn is copied in the memory 118 and available to any of the computers C1–Cn while the data exists within the memory 118. For example, a web page retrieved by the computer C1 and copied within the memory 118 may subsequently be retrieved by any one or more of the computers C1–Cn while the data remains stored within the memory 118. In this manner, the additional delay from retrieving the information from the network 122 via the link L is avoided, thereby resulting in savings of time. Any type of caching scheme or algorithm is contemplated and may be used.

Although the memory 118 may provide a primary level of caching and may be relatively large, it typically comprises a relatively expensive type of memory. Thus, an amount of memory that is large enough for a plurality of users is very costly. The cache disk drive 116 is provided for the server system 112 to supplement any caching performed by the memory 118. In this manner, if the memory 118 is at or near capacity, or if a file retrieved from the network 122 is too large for temporary storage in the memory 118, or if it is desired not to overwrite the cache data currently in the memory 118, the new data is copied to the cache disk drive 116. Although the cache disk drive 116 may not operate as fast as the memory 118, it is considerably faster than retrieving the data from the network 122.

It is desired to transfer data to and from the cache disk drive 116 as fast as possible. Although the cache disk drive 116 may be implemented with a standard file system of a standard operating system (O/S), such as Windows 95, Windows 98, Windows NT, IBM's OS/2, UNIX, Linux, Novell's Netware, etc., such standard file systems would add considerable overhead and substantially increase disk access times. Instead, the cache disk drive 116 is implemented to store raw data files without the traditional file allocation parameters and/or disk overhead normally associated with standard operating systems. In particular, the raw data files retrieved from the network 122 are directly stored into consecutive sectors of the cache disk drive 116. A significant amount of time and overhead is eliminated. Also, most or all of the raw data within the cache disk drive 116 is temporary or transitory and may be overwritten at any time during operation.

Figure 1A:
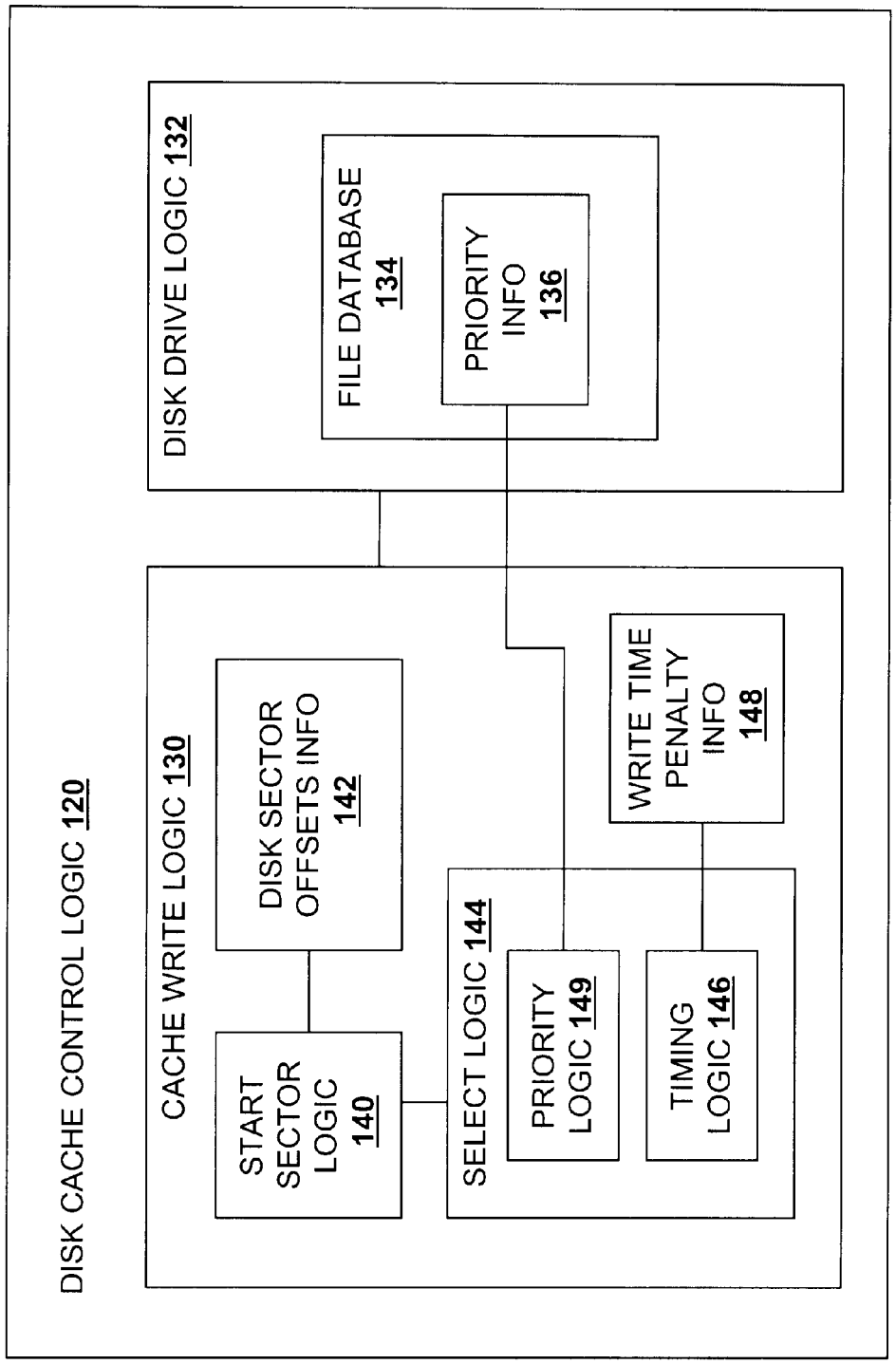
FIG. 1A is a simplified block diagram illustrating an exemplary embodiment of the disk cache control logic of FIG. 1 for controlling disk cache operations.

FIG. 1A is a simplified block diagram illustrating an exemplary embodiment of the disk cache control logic 120 for controlling disk cache operations. The disk cache control logic 120 includes cache write logic 130 coupled to disk drive logic 132. The disk drive logic 132 generally controls read and write operations to and from the cache disk drive 116. The disk drive logic maintains a file database 134 that includes sufficient details of each file stored on the cache disk drive 116, such as name or identification (ID), region, size, etc., to enable the disk drive logic 132 to find and retrieve stored files in an expeditious manner. In one embodiment, priority information 136 is also included for each file within the file database 134. Since the files on the cache disk drive 116 primarily store temporary or transitory cache data, such data may be overwritten at any time with new data from the network 122. The priority information 136 is used to determine the relative importance of stored files to select which files may be overwritten, as further described below. It is noted that when selecting among various places to write data on the cache disk drive 116, it is desired to select a region having a lowest relative priority level. The priority of the data may be made according to any one of many disk caching techniques. For example, the data associated with the computer C1 may have a higher relative priority as compared to the computer C2 or Cn or vice versa.

The cache write logic 130 is used by the disk drive logic 132 to determine where to write a new file onto the cache disk drive 116. Start sector logic 140 identifies a potential start sector in the current track of the cache disk drive 116. The current track refers to the track of any current read or write operation that has just completed or that is about to complete. The potential start sector refers to the sector in the current track to which the write may occur with minimal delay. After a write operation, another write operation may occur at the very next sector in the same track with the same R/W head. After a read operation, however, a delay is incurred, referred to as a write access time, since the R/W head must transition from read to write before the write operation begins. Meanwhile, the disk platters are rotating and rotate past the heads by an offset number of sectors. As described further below, the start sector logic 140 consults disk sector offsets information 142, in the form of one or more files or tables, to determine or otherwise retrieve a sector offset number that is added to a number representing the current sector to derive a first potential start sector. In one embodiment of the present invention, the disk drive logic 132 provides the start sector logic 140 with the current sector number, and the start sector logic 140 determines an offset sector using the disk sector offsets information 142, and returns a sector number of the offset sector to the disk drive logic 132, where the offset sector is the potential first start sector. The disk drive logic 132 may then begin writing to a write section, comprising one or more sectors, beginning with the determined first start sector.

The disk sector offsets information 142 may further include step offsets to other potential start sectors in the cache disk drive 116. As described further below, the cache disk drive 116 includes multiple parallel and concentric circular platters, each with one or two write surfaces, resulting in multiple aligned tracks and sectors within a given cylinder (stack of aligned tracks) of the cache disk drive 116. The start sector logic 140 retrieves the offset sector number and a step offset number representing the sector density for the current track to obtain aligned sectors on aligned tracks of the other platters. The start sector logic 140 determines a plurality or multiple number of potential start sectors for the cache disk drive 116. Since the R/W heads are all aligned with the aligned tracks and sectors, a write operation may be started at any of the potential start sectors determined by the start sector logic 140 with approximately the same write access delay.

It is noted that the sector offset and step offset could potentially be the same across the entire surface of the platters of the cache disk drive 116, so that the 116 would include a small amount of data. Most modern disk drives are zoned, however, where each zone includes a different sector density. Thus, the 116 includes a different sector offset and step offset for each zone of the cache disk drive 116. Such offsets may vary from one disk type to another, and such information may be provided by the manufacturer or may be derived by measuring the read/write parameters of the disk drive.

The cache write logic 130 further includes select logic 144 coupled to the start sector logic 140 to facilitate selection among the plurality of potential start sectors determined by the start sector logic 140. The select logic 144 includes timing logic 146 that is used to determine the total write time for each of the start sectors. The total write time depends on the size of the write and the general disk characteristics, such as the spin rate of the platters, and may be the same for each of the write sections associated with the start sectors. Some of the write sections, however, may include sector boundaries or other write time penalties, such as a delay incurred when switching from one track to the next between two consecutively numbered sectors. Other write time delays are contemplated, such as any time delays that occur on certain tracks, any time delays associated with switching tracks, any time delays associated with switching from one surface or platter to another, any time delays associated with switching R/W heads, etc.

The cache write logic 130 may further include write time penalty or delay information 148, in the form of one or more files or tables, which includes timing delay parameters associated with the cache disk drive 116. The write time penalty information 148 may be incorporated into the disk sector offset information 142. For example, a table of sector offsets and step offsets may further include corresponding time penalty parameters for each zone of the cache disk drive 116. The time penalty information, however, may not necessarily correspond to the sector offsets, and thus may be provided in separate files or tables. In any event, the timing logic 146 consults the write time penalty information 148 to determine any write penalties that may be incurred for a given write operation for a given write section, where any such write time delays or penalties are included in estimates of total write time for each potential write section. The select logic 144 may use the total write time for each write section associated with each determined start sector to select among the write sections. For example, the write section having the least total write time would be selected if time is the most important factor for caching data.

The select logic 144 may further include priority logic 149 for selecting among the multiple write sections. The priority logic 149 consults the priority information 136 to determine the relative priority or priority level of the stored data in each sector of each potential write section. The priority level assigned to a write section is equal to the highest priority level assigned to the sectors in the write sections. For example, if there are five (5) priority levels 1–5 with 1 being the highest and 5 being the lowest priority level, then the write section is given a priority level of 1 if any sector has a priority level of 1 in that write section. Of course, other techniques could be used, such as an average of the priority levels of the sectors. If there is no data stored in one or more sectors of a write section, the priority level assigned to those one or more sectors is the lowest priority level, such as 5 in the above example. The priority logic 149 assigns a priority level for each potential write section determined by the start sector logic 140. The select logic 144 may use the assigned priority levels of the potential write sections for the selection process. For example, the potential write section having the lowest assigned priority level may be chosen as the section to write new data from the network 122. The select logic 144 may choose a write section based on any combination of priority level and total write time, where either parameter may be chosen as the more important parameter.

Figure 1B:
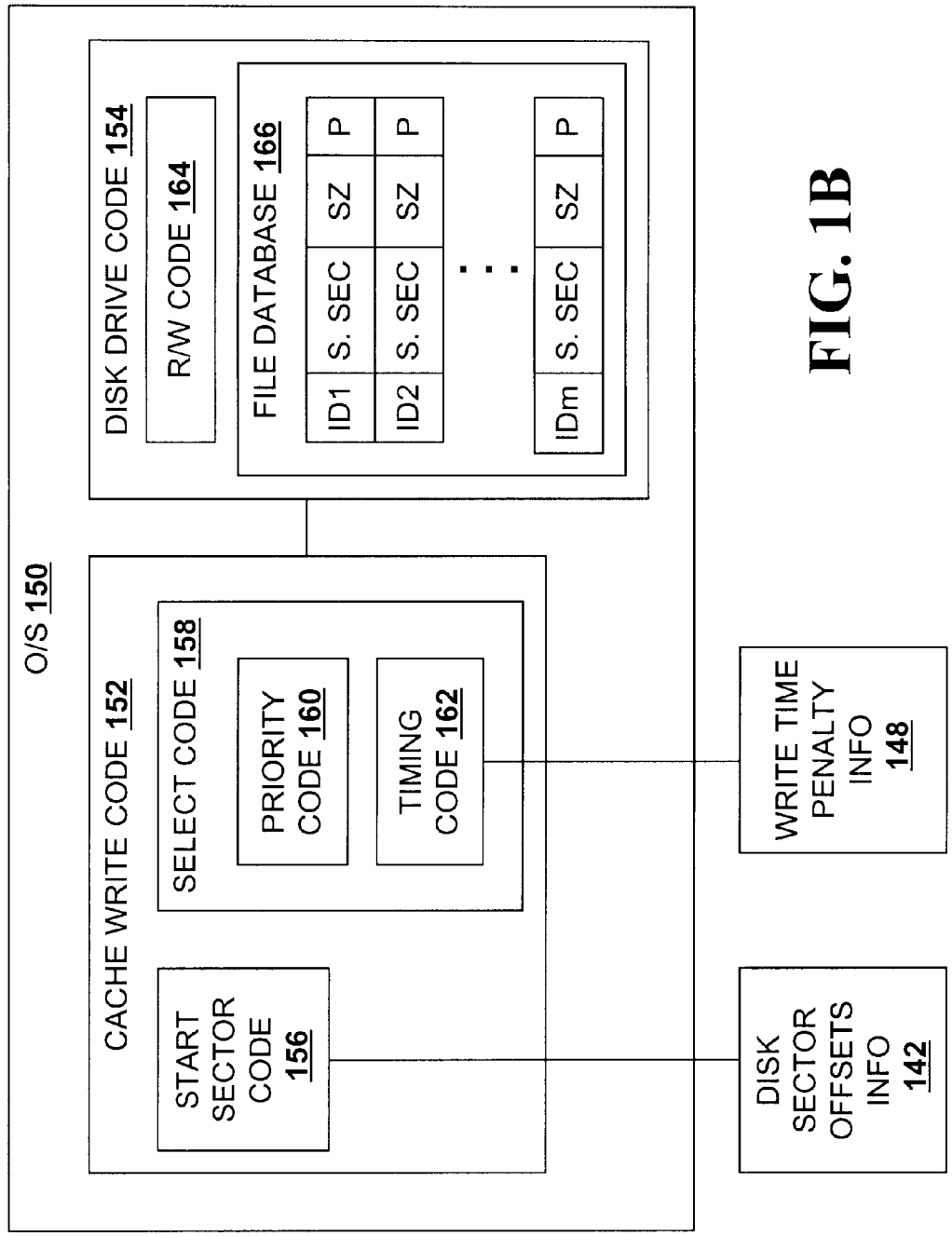
FIG. 1B is a simplified block diagram illustrating of an operating system that incorporates a portion of a disk cache system for controlling disk cache operations according to an alternative embodiment of the present invention.

FIG. 1B is a simplified block diagram illustrating an operating system 150 that incorporates a portion of a disk cache system according to another embodiment of the present invention for controlling disk cache operations of the cache disk drive 116. The operating system 150 of the server system 112 is typically loaded into the memory 118 for execution by a processor (e.g., CPU 202 of FIG. 2) of the server system 112. The operating system 150 further loads or otherwise incorporates software or code for performing the functions of the various logic of the disk cache control logic 120 embodiment shown in FIG. 1A. In general, the operating system 150 embodies a portion or all of the disk cache control logic 120 and by including code executed by the CPU 202 of the server system 112 to perform similar functions.

In particular, the operating system 150 includes cache write code 152 and disk drive code 154 that roughly correspond to the cache write logic 130 and the disk drive logic 132, respectively. The cache write code 152 includes start sector code 156 that performs similar functions as the start sector logic 140. The start sector code 156 consults the disk sector offsets information 142 in a similar manner as previously described, which may be separately loaded into the memory 118. The cache write code 152 further includes select code 158 that corresponds to and that performs similar functions as the select logic 144. The select code 158 includes priority code 160 that corresponds to and that performs similar functions as the priority logic 149 and timing code 162 that corresponds to and that performs similar functions as the timing logic 146. The timing code 162 may consult the write time penalty information 148 loaded into the memory 118 in a similar manner as previously described. The priority code 160 may consult priority information incorporated within a file database 166 of the disk drive code 154.

The disk drive code 154 includes R/W code 164 for controlling read and write operations to and from the cache disk drive 116. The disk drive code 154 includes and maintains the file database 166, which may be similar in function and form as the file database 134. The file database 166 includes a list of file parameters and incorporates the information of the file database 134 and the priority information 136. In the embodiment shown, the database 166 includes a table with a list of entries including an entry for each file stored. Each entry includes a file name or identifier (ID1, ID1, ... IDm, for m files, where m is an integer), a start sector number (S. SEC) for locating an identified file on the cache disk drive 116, the size (SZ) of the identified file, and priority (P) information for the identified file. The disk drive code 154 accesses the file database 166 as necessary when writing data to the cache disk drive 116.

The priority information may be implemented in any desired manner, such as an integer representing a priority level of the corresponding file (e.g., priority levels 1–5 with 1 being the highest priority level). The priority may be determined by file type, the type of data, the relative importance of the data, the relative priority (or importance) of the user requesting the data, the length of time that the data resides on the cache disk drive 116, etc., or any combination of these factors. The priority levels may be static and stay the same while the file resides on the cache disk drive 116, or the priority values may be dynamic and periodically updated by the disk drive code 154. For example, the R/W code 164 may continuously or otherwise periodically review the priority levels of the list of files in the file database 166 and update the priorities based on staleness of the data.

Figure 2:
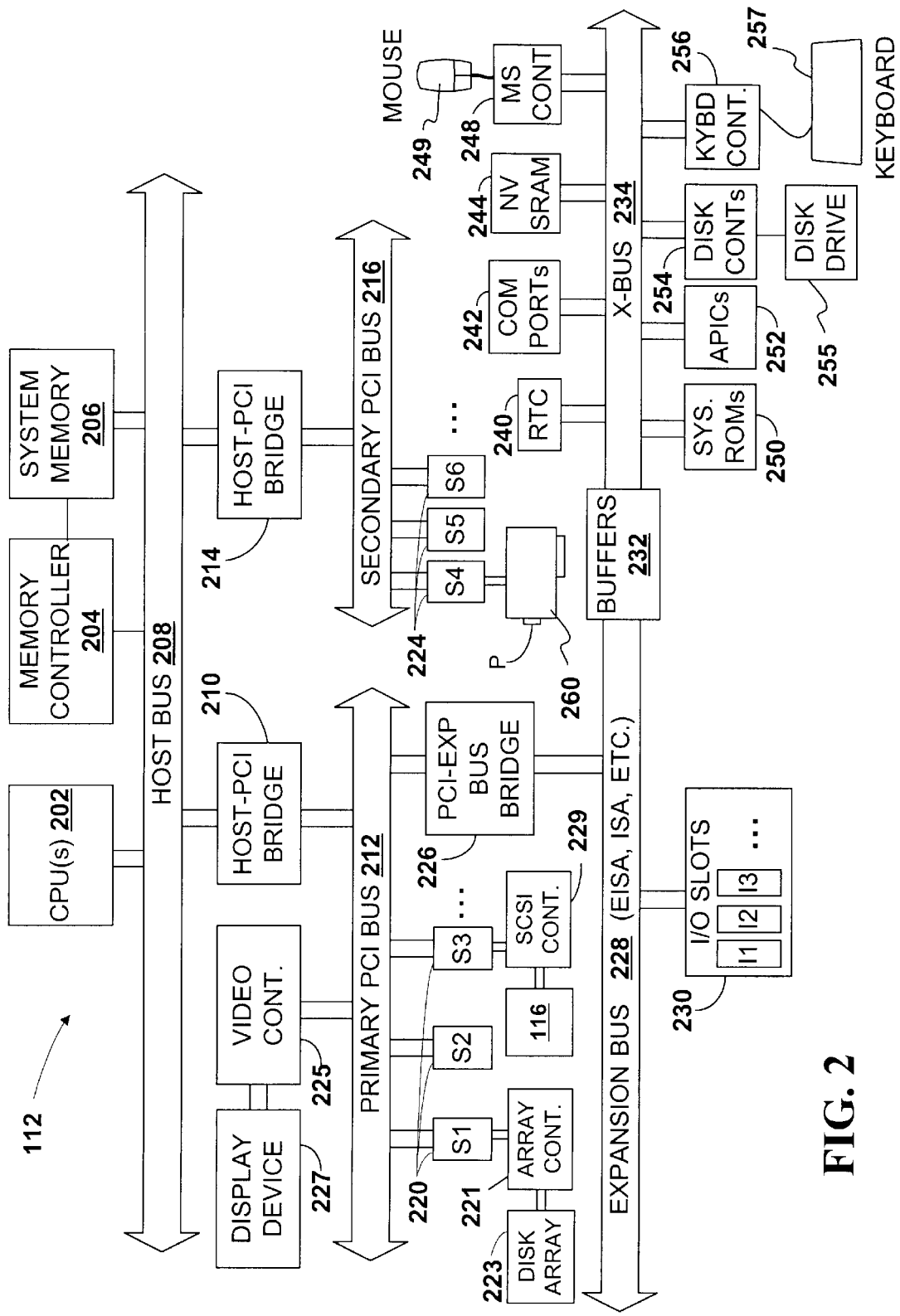
FIG. 2 is an exemplary system block diagram of the server system of FIG. 1.

Referring now to FIG. 2, an exemplary system block diagram is shown of the server system 112. The server system 112 is preferably an IBM-compatible, high-end personal computer (PC) system or the like typically used for workstations or server systems, although any type of desktop, portable or laptop computer is also contemplated. Although the present invention is illustrated using an IBM-compatible type computer system, it is understood that the present invention is applicable to other types of computer systems as known to those skilled in the art. The server system 112 includes a host bus 208, which is coupled to one or more central processing units (CPUs) 202. Only one CPU 202 is shown, though it is understood that a multiprocessor computer system is also contemplated. The CPU 202 may include an appropriate processor and supporting circuitry, such as the 80486, Pentium™, or Pentium II™, Pentium III™, etc. microprocessors from Intel Corp., although other types of processors are contemplated, such as the K6 line of microprocessors by Advanced Micro Devices, Inc. (AMD). The external circuitry preferably includes an external or level two (L2) cache or the like (not shown). A memory controller 204 is coupled to the host bus 208 for interfacing system memory 206. The system memory 206 is preferably implemented with one or more memory boards plugged into compatible memory slots on the motherboard of the server system 112.

The server system 112 may include one or more peripheral, expansion, input/output (I/0) buses, etc. as desired. For example, the exemplary configuration includes a primary PCI bus 212 coupled to the host bus 208 via a Host-PCI bridge 210. The primary PCI bus 212 is typically implemented with one or more PCI slots 220, individually labeled S1, S2, S3, and so on. Each of the PCI slots 220 are configured to receive compatible PCI adapter cards incorporating one or more PCI devices as known to those skilled in the art. Typical PCI devices include network interface cards (NICs), disk controllers such as a SCSI (small computer systems interface) disk controller, video or graphics controllers, etc. In the exemplary configuration shown, for example, an array controller 221 is plugged into the slot S1 for coupling a disk array 223 of hard disk drives, such as for implementing the disk drive system 114. Another SCSI controller 229 is shown plugged into the slot S3 for coupling the cache disk drive 116. One or more integrated PCI devices may also be included, which are typically integrated onto the motherboard itself and coupled directly to the primary PCI bus 212. In the exemplary configuration shown, for example, an integrated video controller 225 is coupled to PCI bus 212 for coupling to a display device 227, such as a monitor or any other type of output visual device for computer systems.

A secondary PCI bus 216 may also be provided and coupled to the host bus 208 through another Host-PCI bridge 214. The secondary PCI bus 216 is provided for further PCI expansion capability and includes one or more slots 224, which are consecutively numbered above the PCI slots S1–S3, such as PCI slots S4, S5, S6, etc. Although only six (6) PCI slots are shown, more PCI slots may be added to either PCI bus 212, 216 as needed or desired. Since the PCI buses 212 and 216 are both relatively independent and coupled through the host bus 208, they are referred to as "peer" PCI buses with respect to each other. Additional host peer PCI buses may be provided on the motherboard and coupled to the host bus 208 as desired. Each of the host peer PCI buses, such as the PCI buses 212 and 216 shown, may include one or more subordinate PCI buses as known to those skilled in the art. Subordinate PCI buses may be incorporated directly on the motherboard, but are usually provided on PCI adapter cards plugged into any one or more of the PCI slots S1–S6.

The server system 112 includes an expansion bus 228 coupled to the primary PCI bus 228 through a PCI-Expansion bus bridge 226. The expansion bus 228 is any one of many different types, including the industry standard architecture (ISA) bus, the extended industry standard architecture (EISA) bus, the microchannel architecture (MCA) bus, etc. For high-end PC systems, the EISA bus provides greater performance, where the PCI-expansion bus bridge 226 is a PCI-EISA bridge. The expansion bus 228 preferably includes one or more expansion or input/output (I/O) slots 230, individually labeled I1, I2, I3, etc. Various devices incorporated on I/O adapter cards may be coupled to the expansion bus 228 through the I/O slots 230, including expansion bus memory, modems, disk controllers, sound cards, NICs and various other types of controllers as known to those skilled in the art.

The expansion bus 228 also couples to a peripheral expansion bus referred to as the X-bus 234 through a set of bus buffers 232. The X-bus 234 is used for connecting various system components and peripherals to the server system 112, such as system read only memories (ROMs) 250 comprising one or more ROM modules, one or more APICs (advanced programmable interrupt controllers) 252, one or more disk controllers 254 (such as a floppy disk controller (FDC) and a hard disk controller (HDC)) for coupling corresponding floppy or hard disk drives 255, a keyboard controller 256 for coupling a keyboard 257, a real time clock (RTC) and timers 240, communication ports 242, non-volatile static random access memory (NVSRAM) 244, a mouse controller 248 for coupling a mouse 249, as well as other peripherals not shown, such as a direct memory access (DMA) system, diagnostics ports, command/status registers, battery-backed CMOS memory, etc.

In the exemplary embodiment shown, a NIC 260 is plugged into the PCI slot S4 of the secondary PCI bus 216 for enabling the server system 112 to couple to and communicate with a comparable network, such as the LAN 101 shown in FIG. 1. In particular, the NIC 260 enables the server system 112 to couple to the network device 110 to communicate with the computers C1–Cn and the network 122.

Figure 3:
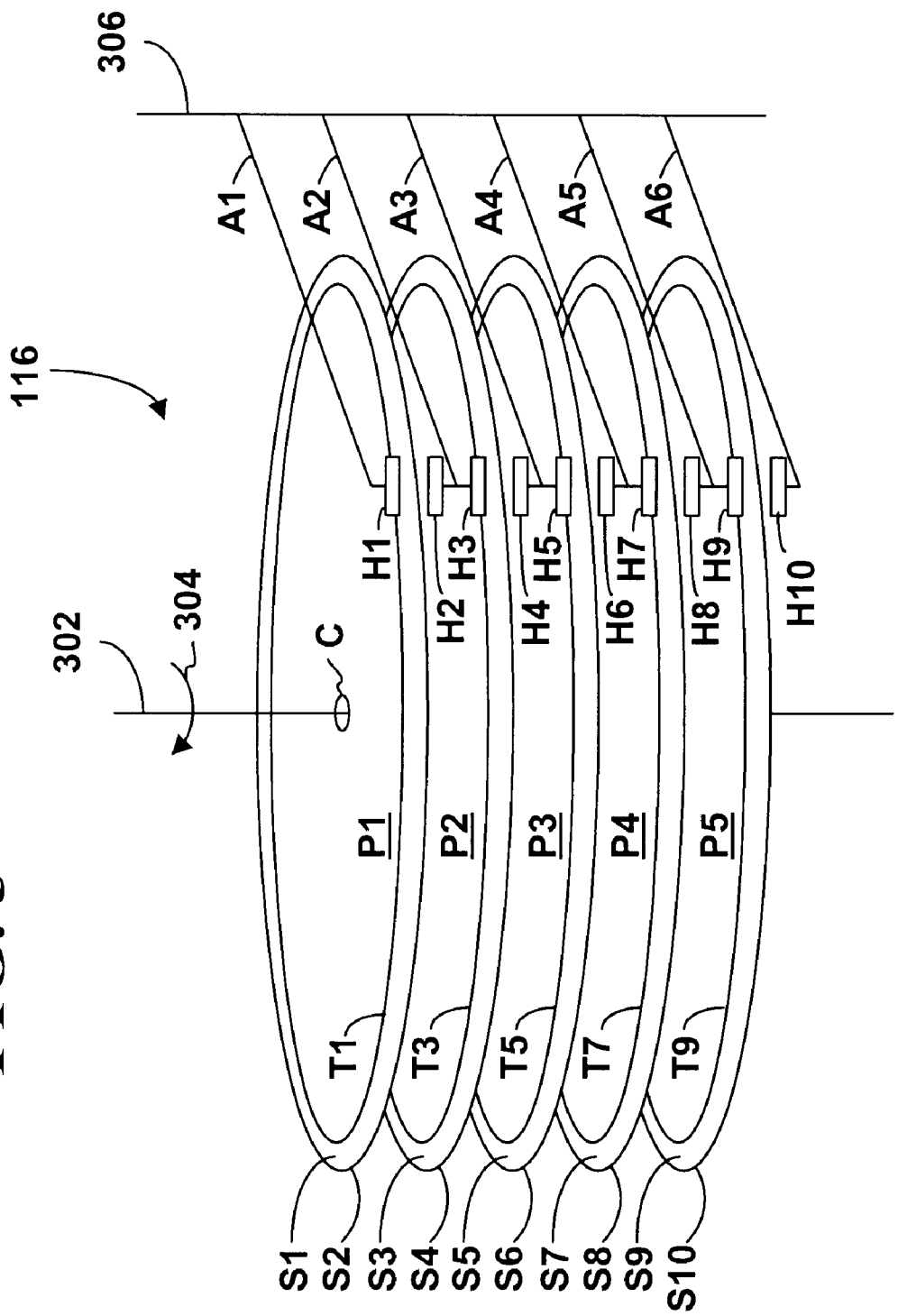
FIG. 3 is a perspective diagram of an exemplary configuration of the cache disk drive of FIG. 1.

FIG. 3 is a perspective diagram of an exemplary configuration of the disk drive 116 according to an exemplary embodiment of the present invention. The disk drive 116 typically includes a plurality of platters, such as platters P1, P2, P3, P4 and P5 as shown in FIG. 3, each having a center C and which are concentrically aligned in a column relative to a common axis 302. Each of the platters P1–P5 includes two surfaces top and bottom. In particular, the platter P1 includes surfaces S1 and S2, the platter P2 includes surfaces S3 and S4, the platter P3 includes surfaces S5 and S6, the platter P4 includes surfaces S7 and S8, and the platter P5 includes surfaces S9 and S10 as shown in FIG. 3. An actuator motor (not shown) rotates each of the platters P1–P5 in either rotational direction such as clockwise as indicated by arrow 304 relative to the common axis 302.

The disk drive 116 further includes a head actuator 306 with a plurality of actuator arms A1, A2, A3, A4, A5 and A6. Each of the actuator arms A1–A6 includes one or two read/write (R/W) heads for reading data from and for writing data to any one of a plurality of tracks located on each of the surfaces of the respective platters P1–P5. In particular, an actuator arm A1, mounted to the head actuator 306, is mounted with a R/W head H1 for reading and writing along tracks on the surface S1 of the platter P1. An actuator arm A2, mounted to the head actuator 306, is mounted with two R/W heads, H2 and H3, for reading and writing to the respective surfaces S2 and S3 of the respective platters P1 and P2. In a similar manner, actuator arms A3, A4 and A5 are mounted to the head actuator 306, and each are mounted with two R/W heads H4 and H5, H6 and H7, and H8 and H9, respectively, for writing to surfaces S4 and S5, S6 and S7, and S8 and S9, respectively, of the respective platters P2–P5. A final actuator arm A6 mounted to the head actuator 306 is mounted with a single R/W head H10 for reading and writing to surface S10 of the platter P5.

In the embodiment shown, all of the actuator arms A1–A6 are aligned and are moved together via the head actuator 306 by a corresponding head actuator motor (not shown), so that all of the R/W heads H1–H10 move together in unison. For example, the R/W head H1 is aligned to read and write along a track T1 of the platter P1, the R/W heads H3, H5, H7 and H9 are aligned to read and write data along tracks T3, T5, T7 and T9, respectively, of the surfaces S3, S5, S7 and S9 of the platters P2, P3, P4 and P5, respectively, as shown in FIG. 3. Similarly, the R/W heads H2, H4, H6, H8 and H10 are correspondingly aligned along tracks T2, T4, T6, T8 and T10 (not shown in FIG. 3) of surfaces S2, S4, S6, S8 and S10, respectively.

The head actuator 306 positions the actuator arms A1–A6 and corresponding R/W heads H1–H10 into a plurality of predetermined positions forming a corresponding plurality of concentric tracks and corresponding cylinders. Thus, each of the surfaces S1–S10 are configured with a plurality of circular and concentrically aligned tracks between near the center C to an outer portion of the platters for reading and writing data using the respective R/W heads H1–H10. In this manner, each R/W head, when in a predetermined position, traces out a separate track across the surface of the associated platter. Each combination of concentric tracks corresponding to a given position of the head actuator 306, such as the tracks T1–T10 previously described, forms a concentric cylinder or vertical stack of tracks. In this manner, the number of consecutive and concentric tracks along each surface of each platter is the same for all of the platters P1–P5 and is equal to the number of cylinders of the disk drive 116.

Figure 4A:
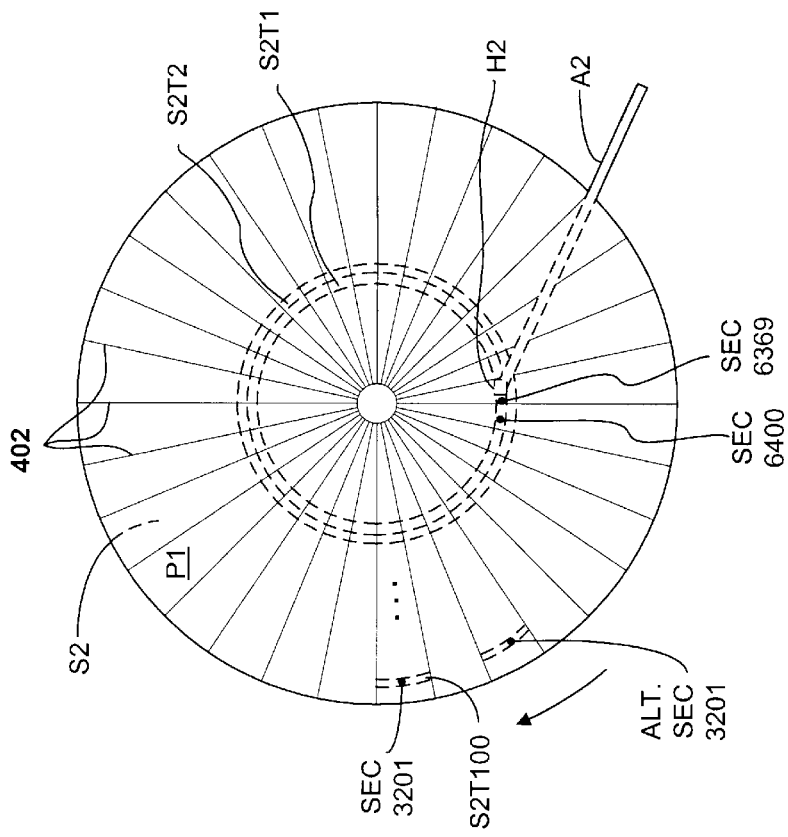
FIG. 4A is a top view diagram of a first surface on a first platter of the disk drive of FIGS. 1 and 3 illustrating an exemplary track organization and sector mapping along the first surface.

FIG. 4A is a top view diagram of the surface S1 of the platter P1 of the disk drive 116 illustrating an exemplary track organization and sector mapping along the surface S1. As shown in FIG. 4A, a first track T1 along surface S1, denoted track S1T1, is formed towards the innermost portion of the surface S1 of the platter P1. An adjacent and concentric second track, denoted track S1T2, is formed just outside of track S1T1 along surface S1. In the simplified diagram shown in FIG. 4A, 100 tracks are shown distributed across the surface S1 of the platter P1, denoted S1T1, S1T2 . . . S1T100, where S1T100 is the outermost track of the surface S1. Each of the tracks is radially subdivided into a plurality of sectors, so that each sector comprises an arc portion of a corresponding track. Address pits or sector lines 402 are radially distributed about the surface S1 of the platter P1 to subdivide each of the tracks along the surface S1 of the platter P1. In this manner, each of the tracks is further subdivided into 32 sectors. It is understood that a typical high capacity disk drive includes significantly more than 32 sectors per track and 100 tracks per surface. Also, as described further below, these configurations ignore another common technique called zoning. The configurations shown in FIGS. 4A–D are simplified versions for purposes of illustration, where the general concepts are applicable.

The R/W head H1 coupled to the actuator arm A1 is shown positioned over a first sector (SEC 1) of the track S1T1, which is the innermost track of the surface S1. The sectors along each track are consecutively numbered. Thus, the track S1T1 includes sectors 1–32 (SEC 1, SEC 2 . . . SEC 32). In the simplified configuration shown in FIG. 4A, the next sector 33 (SEC 33), is provided within the second track S1T2 of the surface S1. It is noted, however, that a time delay is required to move the R/W head H1 via the actuator arm A1 from the first track S1T1 to the second track S1T2. Since the platter P1 is rotating during operation, typically at a constant rate, a certain minimum number of sectors pass under the R/W head H1 while it is moving from one track to the next. In typical disk designs, the heads can switch to another track well before the platters have completed a full revolution. For example, a disk rotation may take approximately 8 milliseconds (ms), while a track switch may take only 2 ms. Thus, the next sector on the next track, such as sector 33 of the second track S1T2, is typically skewed by a certain number of sectors relative to the previous sector, such as the sector 32 of the track S1T1. As shown in FIG. 4A, for example, the sector 33 is offset from the sector 32 by 9 sectors, which corresponds to approximately one-quarter clockwise turn of the platter P1. Continuing in this manner, the sectors along the second track S1T2 of the surface S1 are numbered SEC 33 to SEC 64 in a similar manner as the first track. The organization of sectors along the surface S1 of the platter P1 continues in this manner up to the final, outer track S1T100 which includes sectors 3169 to 3200 for a total of 3200 sectors.

In the configuration of FIG. 4A, the next 3200 sectors 3201 to 6400 may be distributed along surface S2 of the platter P1 in a similar fashion as shown in FIG. 4A. The sector positions of the sectors 3201 to 6400 could be distributed in the exact same way as shown in FIG. 4A such that sector 3201 is positioned on an innermost track and sector 6400 is positioned along an outermost track of the surface S2. In such configuration, however, a write to a plurality of sectors including sectors 3200 and 3201 would require that the R/W heads traverse the entire surfaces of the platters between the outermost track to the innermost track, causing a significant delay during the write.

Figure 4B:
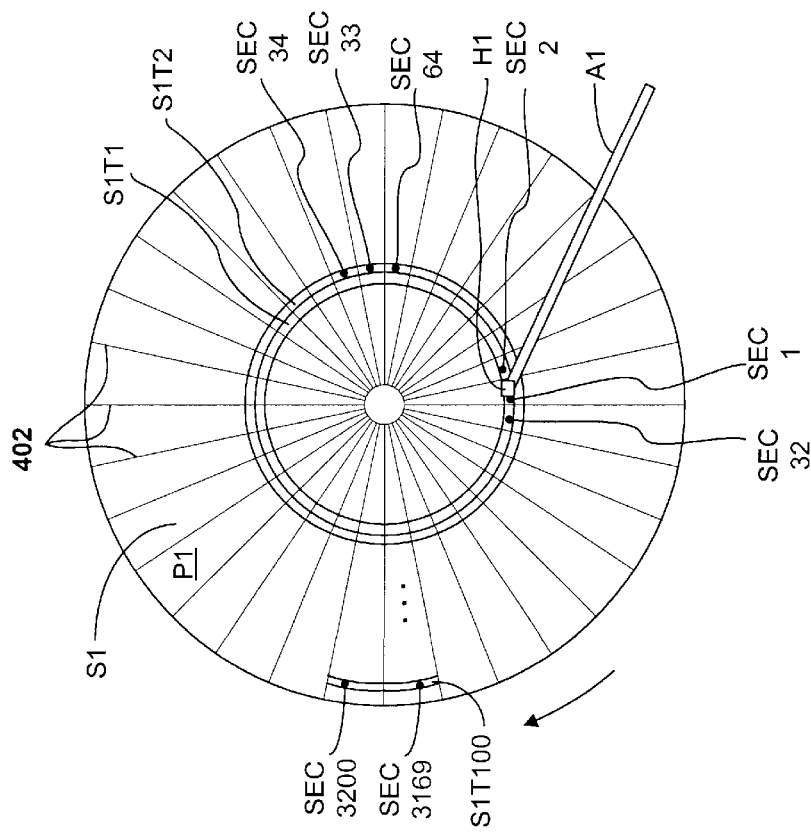
FIG. 4B is a top view diagram of a second surface on the first platter of the disk drive of FIGS. 1 and 3, looking through and past the first surface, illustrating an exemplary track organization and sector mapping along the second surface.

FIG. 4B is a top view diagram of surface S2 of the platter P1, looking through and past the first surface S1, illustrating an exemplary track organization and sector mapping of sectors 3201 to 6400 along surface S2. In this configuration, the sector 3201 is positioned along the outermost track S2T100 of the surface S2. The sectors are organized beginning with sectors 3201–3232 on the outermost track S2T100 to the sectors 6369 to 6400 along the innermost track S2T1. In this manner, a write to a plurality of sectors including sectors 3200 and 3201 would not result in the R/W heads having to traverse the surfaces of the platters. Instead, the write operation simply switches from R/W head H1 to R/W head H2 to write to consecutive sectors 3200 and 3201.

It is noted that, depending upon the construction and configuration of the disk drive 116, a write to sector 3201 by the R/W head H2 may be performed immediately after completion of the write to sector 3200 by the R/W head H1. This is achieved since the R/W head H2 is aligned at the beginning of the sector 3201 just as the write to sector 3200 by the R/W head H1 is positioned at the end of sector 3200, so that there is little or no delay between writing to the two consecutive sectors. It is possible, however, that a delay may occur when switching between surfaces and corresponding R/W heads of a platter or between two different surfaces of two different platters. If such a delay exists in a given disk drive, the sector 3201 may be skewed or offset by one or more sectors along the outermost track S1T100 of the surface S to prevent a delay associated with a complete rotation of the platters, as shown by the skewed position of an alternative sector 3201 relative to the sector 3200 on the surface S1. The number of sectors for the skew depends on the amount of the delay and the rotational speed of the platters to allow as little delay as possible without passing the target sector. In the configuration of FIGS. 4A and 4B, sectors 1–6400 are located on platter P1, sectors 6401 to 12,800 are distributed along the surfaces S3 and S4 of platter P2, and so on.

FIG. 4C is another top view diagram of the surface S2 of the platter P1, looking through and past the first surface S1, illustrating an alternative exemplary track organization and sector mapping of sectors 3201 to 6400 along surface S2. In this alternative configuration, consecutive sectors are arranged by cylinder rather than by consecutive tracks along a given surface. In particular, the sector 33 is located as the first sector of the innermost track S2T1 of the surface S2 of the platter P1, rather than on a different track of the same surface as shown in FIGS. 4A and 4B. As described previously with respect to the configuration shown in FIG. 4B, the sector 33 is positioned such that the R/W head H2 is aligned at the beginning of the sector 33 when the R/W head H1 is at the end of the sector 32 (just after the R/W head H1 has completed writing to the sector 32). In this manner, little or no delay occurs when writing to consecutive sectors 32 and 33 since the heads are aligned as previously described. Also, sector skew may be applied to minimize any delays when switching between surfaces, such as shown by alternative sector position for sector 33 in FIG. 4C.

In the configuration shown if FIG. 4C, sectors 33–64 are provided along the track S2T1 of the surface S2 of the platter P1. The next sets of 32 sectors, namely 65–96, 97–128, 129–160, etc., are distributed along the innermost track of the corresponding surfaces S3, S4, S5, etc., respectively, where the innermost track S10T1 of the surface S10 includes sectors 289–320. The next set of 32 sectors, 321–352, are distributed along any another convenient track such as the second track S1T2 of the surface S1 of the platter P1, or on the second track S10T2 of the surface S10 of the platter P5. The same track delay from switching between one adjacent track to the next is essentially the same for either case. Sector skew may also be applied, as described above, to minimize delay when switching between tracks.

FIG. 4D is a top view of the surface S3 of the platter P2, illustrating another alternative exemplary track organization and sector mapping of the disk drive 116. The configuration shown in FIG. 4D is similar to that shown in FIG. 4C, except that sectors 33–64 are provided along the first track S3T1 of the surface S3 of the platter P2 rather than the first track S2T1 of the surface S2 of the platter P1. In this manner, sectors 33–64, 65–96, 97–128, 129–160 are distributed along the first track of surface S3 of platter P2, surface S5 of platter P3, surface S7 of platter P4, and surface S9 of platter P5, respectively. The next set of 32 sectors 161–192 may be distributed along the first track of the surface S10 or the surface S2 and traverse the even numbered surfaces in a similar manner.

The sector mappings illustrated in FIGS. 4A–D are further complicated by zoning techniques. FIG. 5 is a simplified block diagram of an exemplary surface S of a platter P of the cache disk drive 116, illustrating zone bit recording (ZBR) with four different zones (Z). ZBR techniques recognize the increased length of the sectors at the outer portion of the surface of the platters versus the inner portions so that more data may be packed at the outer zones versus the inner zones. ZBR enables nearly uniform storage densities for each surface while maintaining a relatively unchanged spin rate of the platters. In particular, the density or number of sectors per track is increased at the outer portions of the surface as compared to the inner portions. In particular, a first zone Z1 at the innermost portion of the surface S has a lower number of sectors per track than a second and adjacent cylindrical zone Z2 surrounding the first cylindrical zone Z1. In a similar manner, the next consecutive cylindrical zone Z3 has an even higher sector density than the zone Z2, and a final consecutive cylindrical zone Z4 has an even higher number of sectors per track. However, the R/W heads traverse the outer zones in the same amount of time as the inner zones, so that write pre-compensation techniques are typically used to pad more data in the outer zones as compared to the inner zones.

FIGS. 3, 4A–D and 5 generally illustrate that there are many different types of sector configurations, mappings or organizations that may vary from one disk drive to the next. Although some sector mappings or configurations may be well known and readily provided by a disk drive manufacturer, other mappings may be considered proprietary and thus are not readily available. In any event, it is desired to determine the sector mappings either from information provided by the manufacturer or by empirical data obtained from evaluating read and write data of a disk drive in order to improve disk cache writing operations. In particular, after reading one or more files from a given sector or group of sectors, it is desired to calculate or determine the sector or sectors with the least write access times to which a write can occur as fast as possible. With reference to FIG. 4C, for example, after reading from a sector or group of sectors ending at sector 46 along track S2T1, the R/W heads H1–H10 including the R/W head H2 must be switched from read to write before enabling a write operation to occur. The platter P1 may spin a certain number of sectors, such as six sectors, while the R/W head H2 is switching from read to write. The R/W head H2 may then be positioned to immediately begin the write operation at sector 53 corresponding to a minimum write access time. In general, it is assumed that a switch of the R/W heads from read to write occurs faster than a track switch to move the heads from one track to another. However, the relative time delays between a track switch and a switch from read to write may be comparable.

In a first embodiment according to the present invention, a write operation is initiated at the next sector having the least write access time along the same track from which the read occurred. For example, after reading from sector 46, the write operation begins at sector 53 along the same track S2T1 on surface S2 of the platter P1 as shown in FIG. 4C. In an alternative embodiment, the disk cache control logic 120 selects from among a plurality of corresponding sectors, otherwise referred to as potential start sectors. The plurality of potential start sectors may include a group of sectors associated with approximately the same delay or write access time between the read and write disk cache operations.

Figure 6:
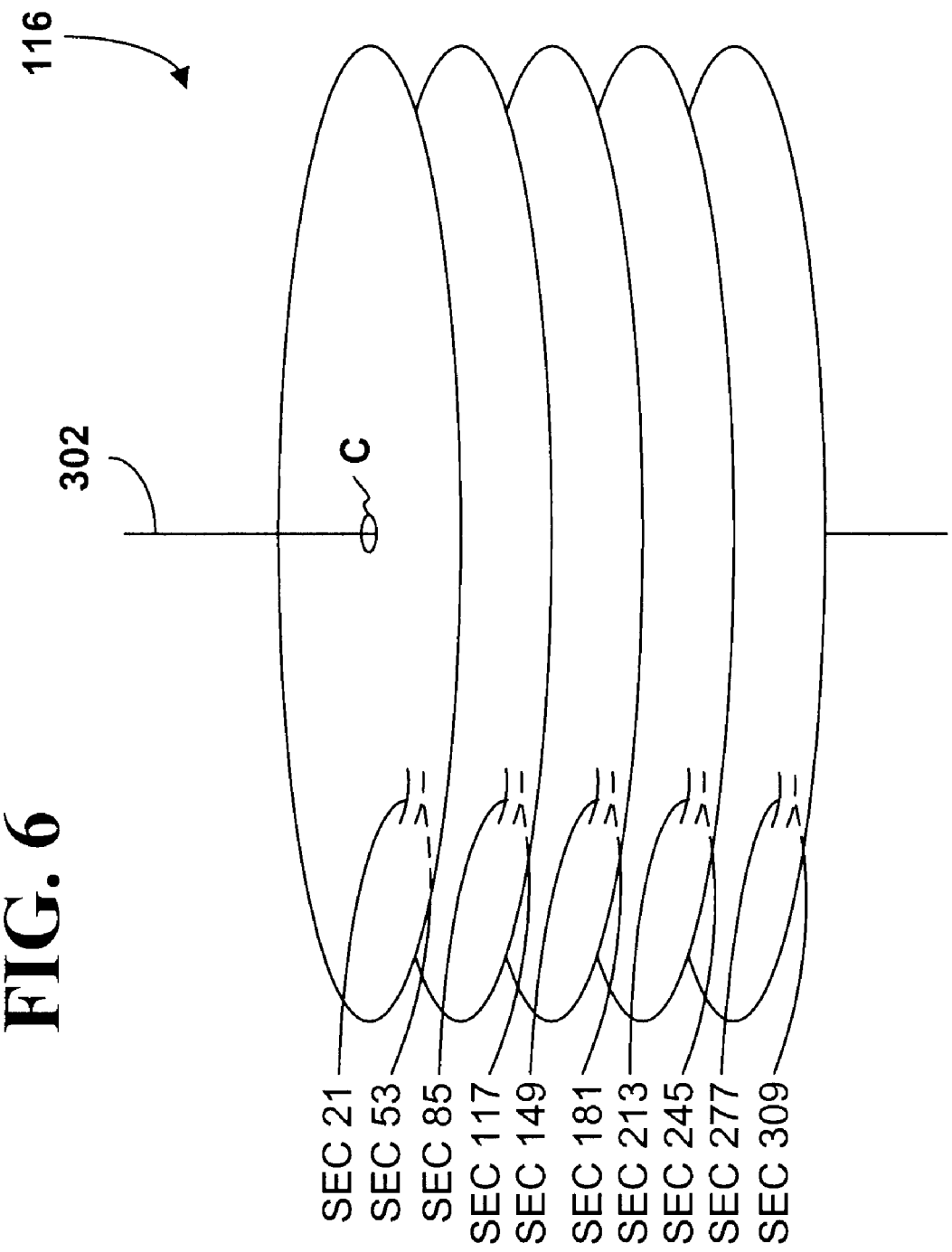
FIG. 6 is a simplified perspective view of the disk drive of FIGS. 1 and 3 according to the configuration of FIG. 4C, illustrating exemplary start sectors.

FIG. 6 is a simplified perspective view of the disk drive 116 implemented according to the configuration of FIG. 4C, illustrating exemplary start sectors. It is determined that a fast disk write may occur at sector 53 along surface S2 in the same track of the platter P1 after a read operation ending at sector 46. Such determination is derived from the characteristics of a given disk drive, such as the spin rate and number of sectors per track for the current zone of the current track. These characteristics are converted to offset information as previously described, which is stored in the disk sector offset information 142 for the cache disk drive 116. The disk cache control logic 120 or the operation system 150, depending upon the particular embodiment, uses the disk sector offset information 142 to determine the first potential start sector 53. The following discussion refers to the disk cache control logic 120, where it is understood that the discussion equally applies to the operating system 150 and corresponding code described in FIG. 1B. Since all of the R/W heads H1–H10 are aligned, the write operation may instead be performed using any of the other heads R/W H1, H3–H10 along corresponding surfaces S1, S3–S10 to other start sectors that are aligned with the first potential start sector. Thus, the disk cache control logic 120 may select any of the aligned start sectors 21, 53, 85, 117, 149, 181, 213, 245, 277 or 309 in aligned tracks in the same cylinder along respective surfaces S1–S10 as shown in FIG. 6. Again, the disk cache control logic 120 uses the disk sector offset information 142, particularly step offsets, to determine the other potential start sectors. Since the write access times are effectively the same for the potential start sectors, any of the other start sectors may be chosen in lieu of sector 53. Any skew information from one surface to the next is incorporated into the disk sector offset information 142.

Several factors or parameters may be used to choose among the plurality of potential start sectors. One consideration is any time delays associated with any particular writes that may make a certain selection less attractive or more costly in terms of total time to complete the write operation. Depending upon the size of the section of data to be written, the write sections corresponding to some of the start sectors may take longer to write as compared to other sections. For example, a write of a section of data greater than 11 sectors may cause a track switch delay if beginning at sector 309 on the surface S10 of the platter P5, since the sector 321 is located on a different cylinder. Thus, using sector 309 as a start sector may be less attractive in terms of total write time as compared to the other corresponding start sectors. The disk cache control logic 120 uses the write time penalty information 148 to determine total write time associated with each potential start sector.

Another factor is the priority of the data that would be overwritten by the disk cache write operation. For example, the data currently located at the consecutive sectors beginning with sector 85 may have a relatively high priority compared to the data located at the consecutive sectors beginning at sector 213. In this manner, sector 213 would be preferred as the actual start sector used rather than start sector 85. When a region is selected for writing data, the operating system 150 and/or the disk cache control logic 120 identifies the relative priority of a file of cache data and updates the priority value or level corresponding to the file in the file database 134 or 166. As described previously, such priority information may be static or dynamic. When determining where to write cache data, the disk cache control logic 120 reviews the priority values in the file database 134 or 166 to select among the plurality of potential start sectors.

Figure 7:
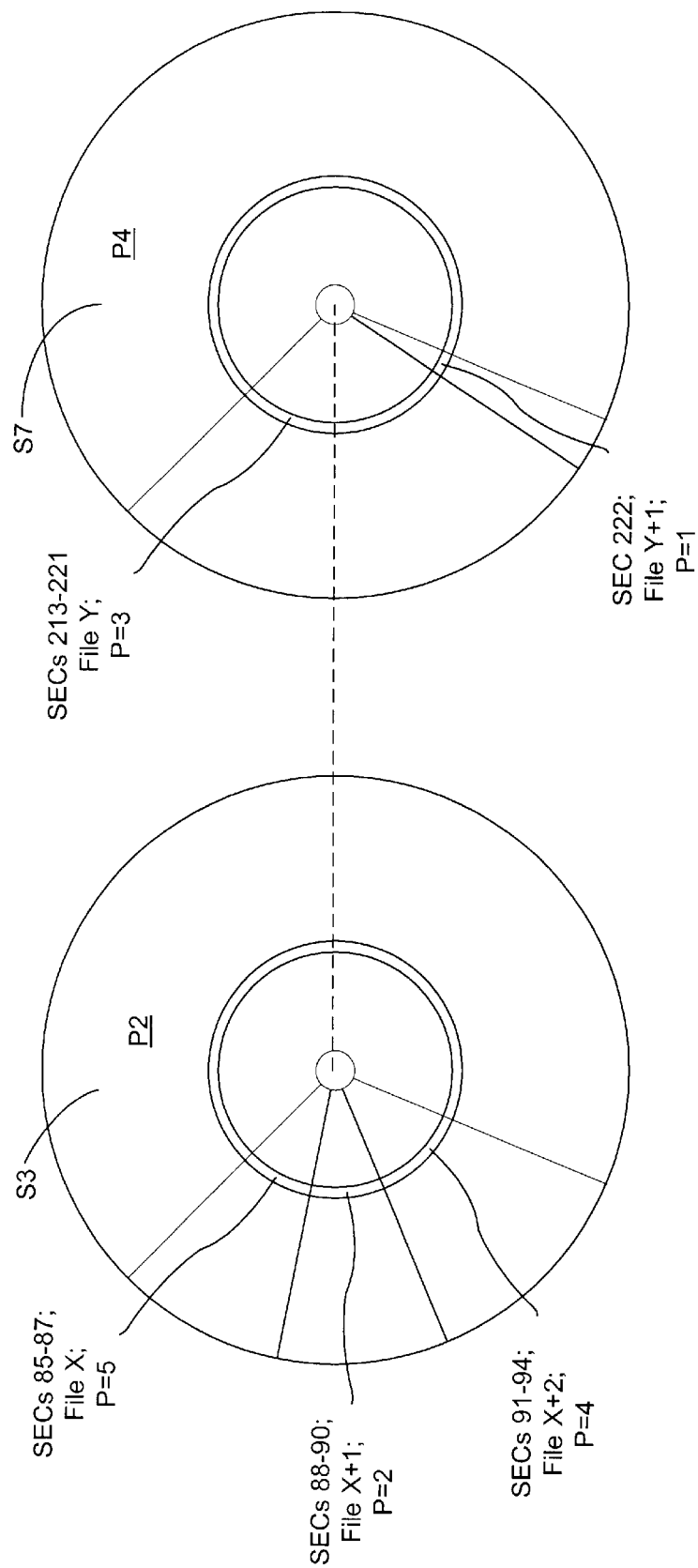
FIG. 7 is a top view diagram of two different surfaces of the disk drive of FIGS. 1 and 3 illustrating a selection process between write sections associated with corresponding start sectors using relative priorities.

FIG. 7 is a top view diagram of the surfaces S3 and S7 illustrating a selection process between write sections associated with the potential start sectors shown in FIG. 6 using relative priorities. In this simplified example, five (5) priority levels 1–5 are used in which 1 is the highest and 5 is the lowest priority level. The disk cache control logic 120 (or the operating system 150), when caching files to the cache write disk 116, writes the priorities to the file database 134 or 166. The disk cache control logic 120 consults the priority information to facilitate selecting a start sector.

In this example, a new file of ten (10) sectors is to be cached beginning at any one of the start sectors 21, 53, 85, etc. FIG. 7 illustrates existing files and priorities associated with start sectors 85 and 213, where a write section of 10 sectors would span between sectors 85–94 or 213–222 depending upon which start sector (85 or 213) is chosen. Of course, FIG. 7 ignores the other potential start sectors for purposes of illustration, where any of the other start sectors shown in FIG. 6 could be chosen as well. As shown on the surface S3 of the platter P2, a first file X spans several sectors including sectors 85–87 and has a relative priority level of 5 (all sectors in a file are assigned the same priority level). A next file X+1 is located at three the sectors 88–90 and has a priority level of 2. A next file X+2, having a relative priority level of 4, is located beginning at sector 91 and includes at least sectors 91–94. Although various priority levels are included in the potential write section of sectors 85–94, the highest priority is chosen. Thus, the start sector 85 is giving a priority of 2 (being the highest priority between 2, 4 and 5 of the files X+1, X+2 and X, respectively).

As shown on the surface S7 of the platter P4, another file Y spans several sectors 213–221 and has a relative priority level of 3. A next file Y+1, having a relative priority level of 1, is located beginning at sector 222. Thus, the start sector 213 is giving a priority of 1 (being the highest priority between 1 and 3 of the files Y+1 and Y, respectively). The disk cache control logic 120 chooses the start sector 85 over the start sector 213 since the start sector 85 has the lower priority. This procedure is repeated for all of the start sectors and the start sector having the lowest priority is selected. Of course, two or more start sectors may have the same priority level, in which case other factors, such as total write time, may be considered. Also, some sectors may have no data or otherwise be empty. Empty sectors are assigned the lowest priority level by default.

In summary, the disk cache control logic 120 uses the current sector and the disk sector offset information 142 to determine a plurality of start sectors. The disk cache control logic 120 then uses the potential start sectors, the size of the write section (total number of sectors) and the write time penalty information 148 to determine the total write time associated with each of the potential write sections for each start sector. The disk cache control logic 120 also uses the start sectors, the size of the write section and the priority information stored in the file database 134 or 166 to determine the relative priority of each of the potential write sections associated with each start section.

The above gathered information may be utilized according to any desired cache prioritization scheme. In one embodiment, the total write time takes precedence, so that the start sector associated with the least total write time is selected over the other start sectors. In the event that two or more start sectors have the same total write time, the priority information is used as a tie breaker, so that the write sections having the lowest priority are selected over higher priority write sections. In the event that two or more write sections and start sectors have the same minimum write time and lowest priority, any tie breaking scheme may be used, such as selecting the lowest numbered surface or R/W head or the R/W head closest to the current track that was just read. In another embodiment, the priority information takes precedence and is considered first, followed by the total write time. Again, any tie breaking scheme may be used to choose among write sections and start sectors having the least total write time and lowest priority. In yet another embodiment, a combination of the total write time and prioritization information is used to select a start sector. For example, after the fastest total write time is determined, the start sector having the lowest priority within 2–3 ms of the fastest write time is selected. The present description is for illustration only, in that the present invention is not limited to any particular prioritization scheme used to select among the start sectors once determined.

Figure 8:
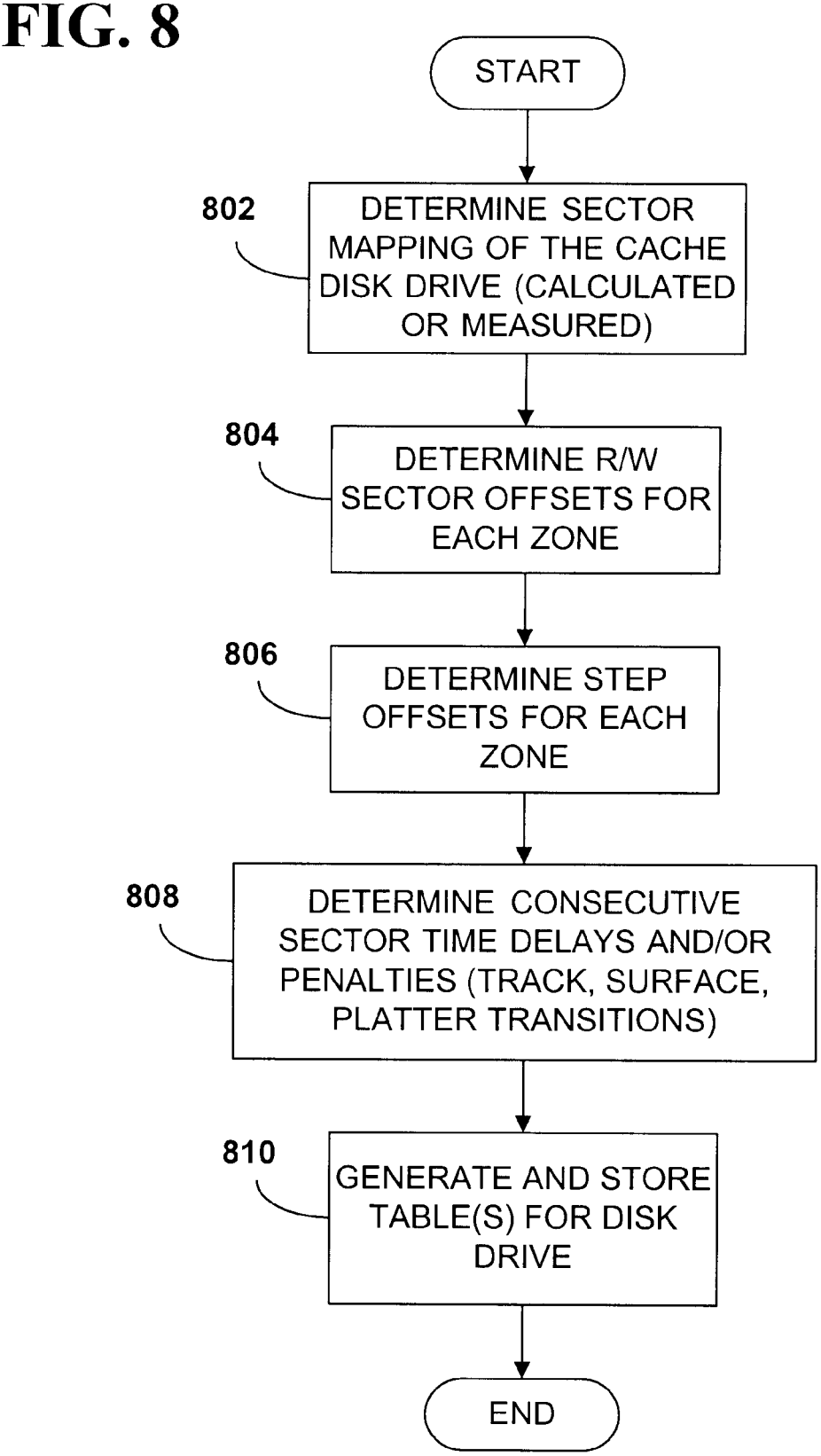
FIG. 8 is a flowchart diagram illustrating operation of the disk cache control logic of FIG. 1 for determination of the track configuration and sector organization and determination of sector offsets and time penalty boundaries of the disk drive of FIGS. 1 and 3.

Referring now to FIG. 8, a flowchart diagram is shown illustrating operation of the disk cache control logic 120 or the operating system 150 for determination of the track configuration and sector mapping including sector offsets, sector step offsets and write time penalty information of the cache disk drive 116. At a first block 802, the cache disk drive 116 is analyzed to determine its basic construction and sector mapping. Such information may include, for example, the number of disk platters and write surfaces, the number of zones per surface (usually constant throughout the platters of the disk drive), the total number of tracks per surface, the number of tracks for each zone, the number of sectors per track for each given zone, etc. The physical location of each of the sectors and their consecutive organization may further be determined. For example, it may be determined whether the sectors are organized according to FIGS. 4A and 4B and any of the variations thereof or according to FIGS. 4C or 4D and any variations thereof. The structure and organization of the cache disk drive 116 may be provided directly from the manufacturer so that such parameters need not be measured. Alternatively, as further described below, the cache drive disk 116 may be analyzed and empirically measured to determine its structure and organization.

At next block 804, the R/W sector offsets for each zone are determined. The R/W sector offsets refer to the number of sectors that pass under the R/W heads H1–H10 while the platters are rotating and while the heads are switching from a read operation to a write operation, and thus correspond to minimum write access times. The R/W sector offsets are different for each zone since a greater sector density exists in the outer zones as compared to the inner zones. At next block 806, any sector step offsets are determined for all zones. The step offsets refer to the number of sectors between similarly located and/or aligned sectors on aligned tracks of the other surfaces of the cache disk drive 116. For example, for the illustration shown in FIG. 6, the sector step offset from one surface to the next is 32 sectors. Step offsets may vary from disk to disk and from zone to zone within a given disk drive. In many configurations, the step offsets are the same from one surface to the next for each zone. The step offsets are different for each zone since each zone has a different sector density. It is noted, however, that some disk drives may have a variable step offset from one surface to the next, depending upon the disk configuration.

At next block 808, any write time delays or penalties when writing to any two consecutive sectors are determined. For example, a write time delay may occur when switching from one track to the another for two consecutive numbered sectors on adjacent (or even non-adjacent) tracks. A time delay may also occur when switching from one surface to the next or from one platter to the next. All such time penalties or delays are identified so that the disk cache control logic 120 may determine the approximate total write time when writing a section of sectors during a disk cache write operation.

At last block 810, one or more files or tables representing the parameters calculated in steps 802–808 are generated and stored either on the cache disk drive 116, within the memory 118, on any of the disk drives of the disk drive system 114, or on any other storage device or medium. For example, sector offsets and/or sector step offsets are written to tables in the disk sector offset information 142, and time penalty information is written to tables within the write time penalty information 148. Of course, once the tables are generated, they comprise static information that may be incorporated within or attached to the operating system code of the server system 112. For example, the tables may be stored within separate files and provided along with the operating system software or may be provided with the disk drive 116 in order to utilize it as a cache disk drive for the server system 112.

Figure 9:
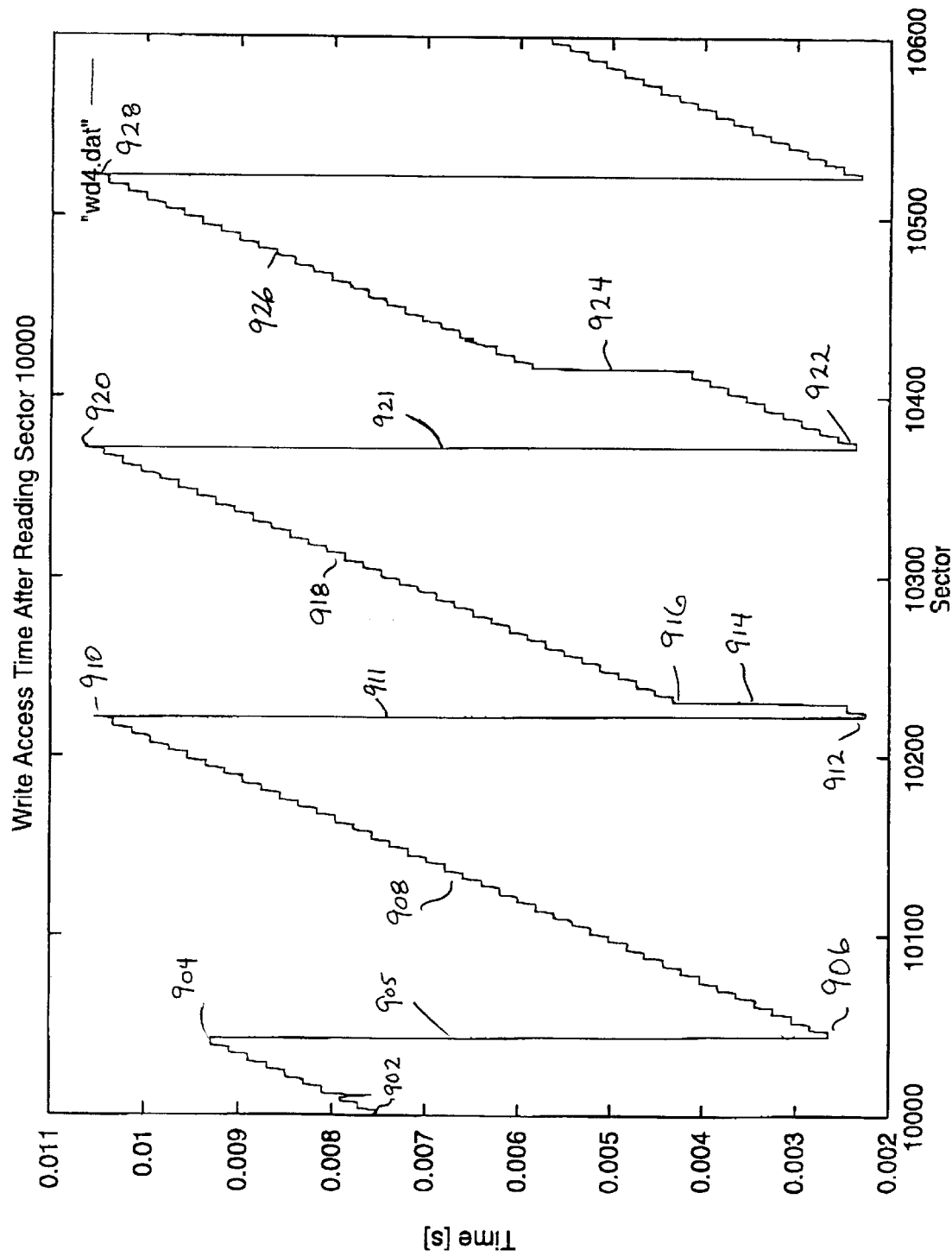
FIG. 9 is a graph diagram of plotted measured write access times for indicated sectors after a read operation using an exemplary 4.35 GB disk drive, which may be used as the cache disk drive of FIGS. 1 and 3.

FIG. 9 is a graph diagram of plotted write access times 900 for indicated sectors after reading the 19 sectors 10,000–10,019 using an exemplary disk drive that could be used as the cache disk drive 116. The particular disk drive used for the data in the write access times 900 is the 4.35 gigabyte (GB) ST-34371 W SCS1 Ultra-wide (Barracuda 4LP) by Seagate Technologies. For this particular Seagate disk drive, it is known that the average sectors per track is 164 (rounded down). It is also known that the number of tracks per surface is 51,780 for each surface of 5 3.5" platters with 10 corresponding R/W heads; the number of bytes per track is 102,500 on the average; and the number of tracks per inch is approximately 5,555. It is also known that the disk is rotating at approximately 7,200 revolutions per minute (rpm), resulting in approximately 8.33 ms per rotation. The particular organization of the sectors, however, was not known.

The sector numbers are plotted along the horizontal or "X" axis, and the access time in seconds (s) is plotted along the vertical or "Y" axis. After reading sectors 10,000–10,019, the write access times graph 900 shows that approximately 7.5 ms elapse before being able to write back to sector 10,000. Thus, the delay time is relatively significant between reading from a sector and writing to a nearby previous sector since the platters must rotate almost completely before the write operation can be performed. Writing to one sector at 904 takes even longer or over 9 ms since the platters must rotate more than a full rotation before writing to that sector after reading the sectors 10,000–10,019. Therefore, reading from a given sector and writing to a nearby subsequent sector takes the most amount of time for a given track.

One particular sector in the same track at 906 has a relatively short access time (after a read operation) and represents a sector offset that enables the R/W heads to fully transition from read to write. For example, the sector at 906 has a write access time of a little more than 2.5 ms, which is significantly faster than the write access times for any of the sectors between 902 and 904. The vertical line 905 represents a maximal write access time differential (6.5 ms or more) between the slowest sector at 904 and the fastest sector at 906 after reading the sectors 10,000–10,019. A write access time differential of approximately 5 ms exists between the sector at 902 and the sector at 906.

It is also noted that minimal write access times are also achieved at the sectors immediately after the sector at 906. It is preferable to err on the side of an additional sector or two for the determined write access time offset for a given zone rather than by a single sector too short to avoid the maximum write access time in any given zone. For example, if the measured sector offsets for a given zone of a disk drive ranges from 50 to 52, the selected offset should be at least 52–54 for the entire zone to avoid the maximal write access time for that zone.

The consecutive sectors between the sector at 906 to the sector at 910 each take about the same incremental amount of time as shown by the stepped slanted line 908. The write access time is approximately 2.3 ms, however, for the sector at 912. It is known that the approximate time to switch the R/W heads from read to write is approximately 2.3 ms. For the sector at 914, a characteristic delay of almost 2 ms occurs. The delay at 914 could possibly be due to a track switch or to a characteristic delay within each track for the particular zone. After the delay at 914, the characteristic step function restarts at the sector at 916 as shown by the slanted stepped line 911 and remains relatively consistent to the sector at 920. The characteristic minimum write access time of approximately 2.3 ms at the sector at 912 repeats for the sector at 922. Another characteristic 2 ms delay occurs at 924, which delay is similar to the delay at 914. It is noted that the write access time to the sector at 906 is longer than the write access times to the sectors at 912 and 922. It is further noted that the number of sectors between the vertical line 905 and the delay line at 914 is approximately the same number of sectors as between the delay lines 914 and 924. It appears that a delay similar to the delays at 914 and 924 may have occurred along line 905, which resulted in the write access time for the sector at 906 to be somewhat greater than the write access times at 912 and 922. After the delay at 924, the characteristic slanted stepped line repeats as shown at 926 up to a sector at 928.

Figure 10:
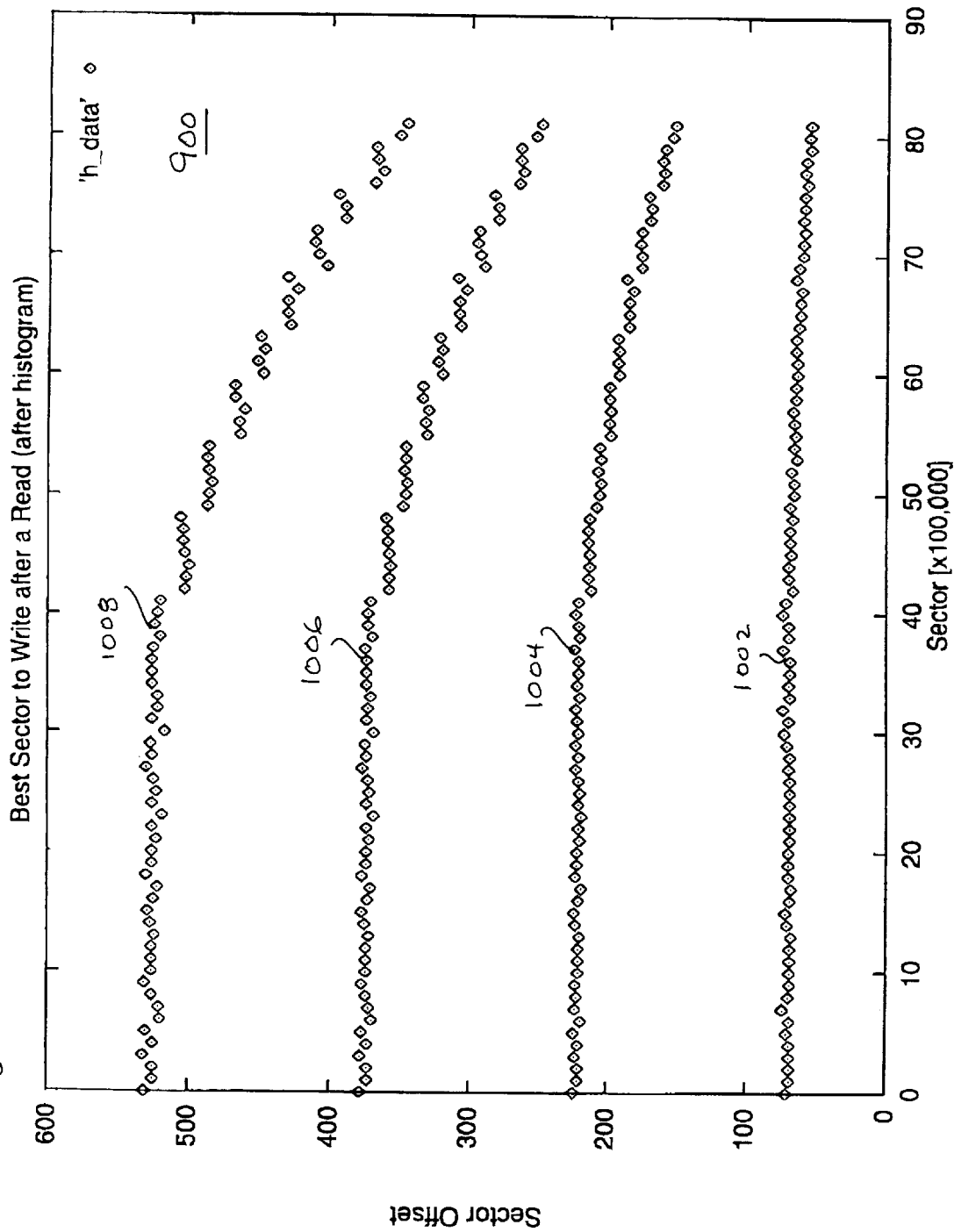
FIG. 10 is a graph diagram of plotted written sectors within a predetermined time period using the exemplary 4.35 GB disk drive.

FIG. 10 is a graph diagram of plotted written sectors within a predetermined time period of 3 ms or less illustrating the fastest write sectors 1000 after a read operation for the exemplary 4.35 GB disk drive by Seagate. To generate the raw data for the fastest write sectors graph 1000, the data from each sector of the disk drive was read and the data was then written to every other sector. The time differential between the read and write operations was determined, and the fastest points were then plotted. For example, the fastest points were those corresponding to 3 ms or less. Histogram processing was then performed on the raw data, resulting in the fastest write sectors graph 1000. The sectors that were read are plotted along the horizontal or "X" axis, and the sector offsets relative to the read sectors is plotted along the vertical or "Y" axis.

The fastest write sectors graph 1000 illustrates a clear banding effect in which the fastest write access times between the read and write operations cluster together. In general, four different bands—1002, 1004, 1006 and 1008—are shown in the fastest write sectors graph 1000, each initially located at approximate sector offsets 70, 220, 370 and 520, respectively. Each of the bands is initially approximately 150 sectors apart up to approximately the four millionth sector. In operation, after reading sector 0, a fast write may be achieved to approximately sectors 70, 220, 370, 520, 690, etc. according to the banding information. When reading and writing to higher numbered sectors, the bands start shifting down, with smaller offsets generally denoting the different zones on the disk drive. The shifting down of the bands is a result of ZBR or zoning, where more sectors per track are provided at the outer tracks as compared to the inner tracks.

FIG. 11 is table of offsets and step offsets measured for the exemplary 4.35 GB disk drive by Seagate. The periodic nature of the write access times graph 900 and the data from the fastest write sectors graph 900 for the 4.35 GB disk drive by Seagate enables sector offsets and sector step offsets to be tabulated in a convenient form as shown by the offsets table of FIG. 11. The histograms from the fastest write sectors graph 1000 are analyzed for similarity (same points are considered fast within two (2) standard deviations), and the disk is divided into zones. If four (4) points in a row are found that are off by more than 2 standard deviations, a new zone is created, and analysis is continued for that zone. It is determined that there are ten different zones on the disk drive, labeled 0 to 9, having various start and stop sector numbers, listed as 1,000 (or K) sectors (Ksecs) as shown. The offset table includes First Offsets which are different for each zone and represent the number of sectors traversed when switching the R/W heads from a read operation to a write operation. Thus, the First Offsets are the sector offsets needed to obtain the first potential start sector for a given zone. The offset table also includes sector step offsets which represent the number of sectors between aligned sectors on different surfaces of the disk drive, which may be equal to the number of data sectors per track depending upon sector mapping.

A fairly simple equation, denoted equation 1 below, is derived to pick from n different start sectors:

$$z = \text{find\_zone}(\text{sector}) \tag{1}$$

```
for x = 0 to n – 1
    w_sect[x] = ((sector + First_Offset[z])mod SD[z] + x(Step_Offset[z]))mod TS
done
``` where z is a subscript used to lookup corresponding values in the offsets table of FIG. 11, "sector" is the input sector number for the current sector (just read), x is a variable integer that varies from 0 to n–1, where n is the number of surfaces of the disk drive (such as 10), SD is the sector density (sectors per track) for the particular zone z, "mod" indicates the modulo function, the First_Offset[z] and Step_Offset[z] values are read from the offset table, and TS is the total sector number. In this manner, n different start sectors w_sect[0], w_sect[1], w_sect[2] ... w_sect[n] are determined, each corresponding to a different surface of the disk drive including the current surface.

In the first iteration, the First_Offset[z] is added to the current sector number, and the result is applied to the modulo of the sector density (SD), to obtain the first start sector in the current track. The modulo function is used since the sectors in each track wraps around. (For example, if the starting sector is 140 for a track of 160 sectors and the First_Offset[z] is 30, then the result is sector 10). The first result is the first w_sect[0] since x is zero in the first iteration. In the next iteration, the same result is added to the Step_Offset[z] for the particular zone (where x=1), and the modulo of the total sector count (TS) is applied to wrap back around to the beginning sectors of the cylinder if the result overshoots the total number of sectors. For example, if the current track is the last track of the cylinder, then the modulo of TS locates the result back to the first track of the cylinder. Operation proceeds in this manner until a potential start sector is determined for each surface of the disk drive.

Figure 12:
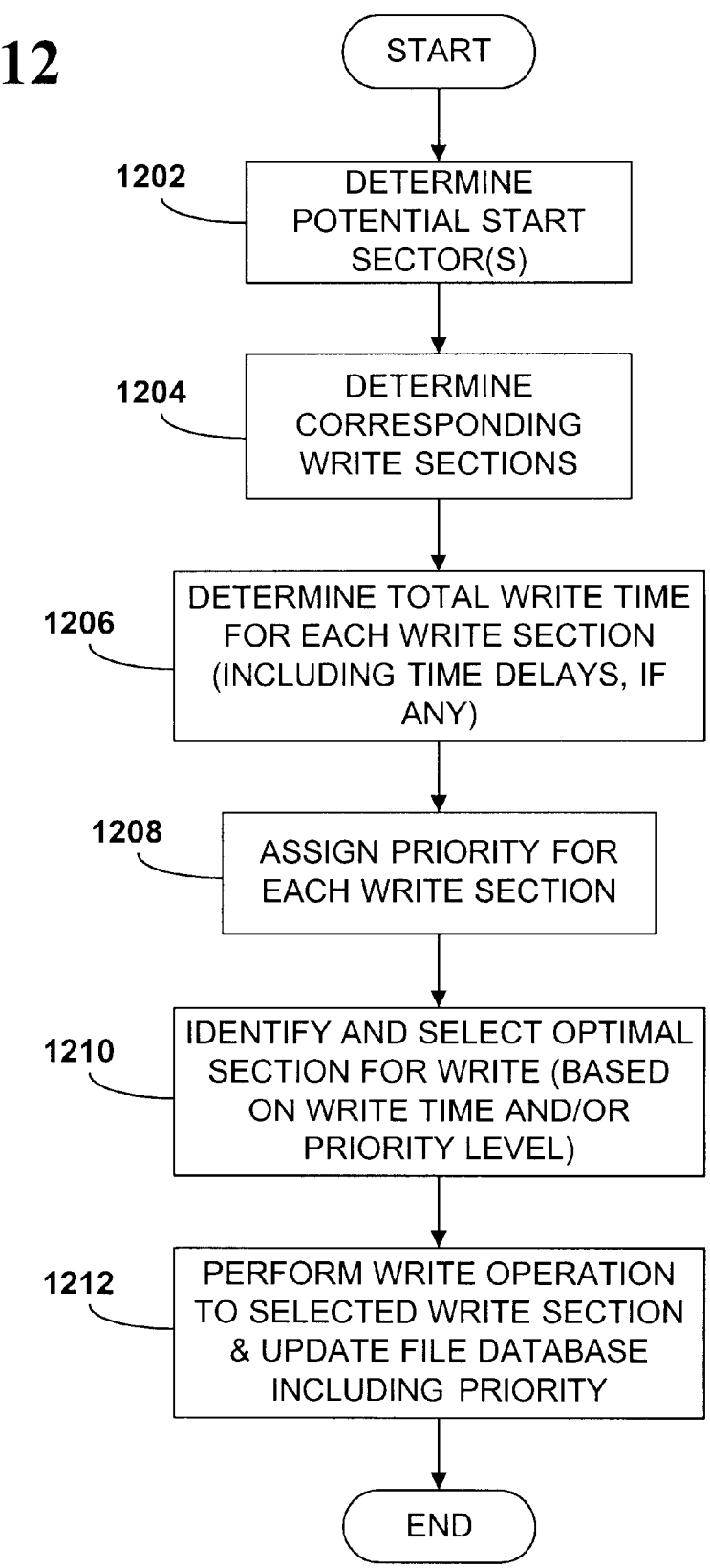
FIG. 12 is a flowchart diagram illustrating a method of selecting among a plurality of start sectors and corresponding write sections according to an exemplary embodiment of the present invention.

FIG. 12 is a flowchart diagram illustrating a method of selecting among a plurality of start sectors and corresponding write sections according to an exemplary embodiment of the present invention. At first block 1202, the potential start sector(s) to perform the write operation are determined based on the current sector. For example, as shown in FIG. 6, the sectors 21, 53, 85, 117, etc., are the potential start sectors for the write operation for the disk drive 116 after reading one or more sectors ending at sector 46. The disk sector offset information 142 is consulted, and the disk cache control logic 120 (or the operating system 150) determines the corresponding start sectors using an appropriate function, such as using equation 1. At next block 1204, the corresponding write sections are determined based on the size of the write operation. Each write section includes those sectors that would be involved in the write operation for each of the start sectors determined at block 1202.

At next block 1206, the total write time for each write section is determined. The total write time includes any time delays or penalties for switching tracks or switching surfaces as determined by the table generated from the operation performed in FIG. 7. The disk cache control logic 120 determines an initial value based on the timing parameters of the disk drive (such as spin rate) and the size of the write, and consults the write time penalty information 148 to add any time penalties that would occur for that particular write section. For example, as shown in the write access times 900 of FIG. 9, the time penalty 914 would be incurred when writing between sectors at 912 and 920.

At next block 1208, the priority level of each section is assigned. The disk cache control logic 120 uses the priority data from the file database 134 or 166 and uses the highest priority sector for each write section as previously described. Thus, the highest priority sector(s) of the spanned files for each of the sections is determined as the priority for that entire write section. At next block 1210, the optimal section for the write operation is identified and selected based upon the total write time and priority level of each write section according to any one of a number of different caching algorithms as previously described. For example, a write operation that would take 10 milliseconds to a given section with low priority may be selected over another section that would only require 9.5 milliseconds that has a higher priority. At last block 1212, the write operation is performed to the section selected at block 1210, and the file database 134 or 166 is updated with information for the new file, including the priority information.

It is now appreciated that a disk cache writing system according to any one or more embodiments according to the present invention substantially improves disk drive caching techniques. A cache disk drive is provided that is dedicated to cache data. Alternatively, a portion of a standard disk drive is reserved for cache data. In this manner, any or all of the current data of the disk drive or cache portion is temporary cache data that may be overwritten at any time. The standard file allocation and storage techniques are avoided thereby substantially reducing write access times. Cache data is written to a write section, including one or more sequential sectors, where the write section has a minimal write access time. The write section begins at a first offset sector associated with a minimal write access time, or at any one of several potential start sectors including the first offset sector. The first start sector resides within the current track of the disk drive to avoid moving the R/W heads to begin the cache write operation. The only initial delay that is encountered is the delay to switch the R/W heads from read to write. On another embodiment, one or more other start sectors, corresponding with the first start sector, are also determined, where each of the other start sectors also avoid moving the R/W heads from the current track since all the R/W heads are aligned within the same current cylinder of the disk drive. The only other delay(s) that may be encountered during the cache write operation are the characteristic delays associated with writing to sequential sectors of the chosen disk drive that are otherwise unavoidable, such as delays associated with switching sequential tracks, heads, surfaces, platters, etc.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A disk drive caching system, comprising:
   a cache disk drive for use as a cache;
   cache write logic, coupled to the cache disk drive, comprising:
      start sector logic that determines a plurality of start sectors including an offset sector relative to a current sector within a current track of the cache disk drive and at least one other sector that corresponds to the offset sector; and select logic, coupled to the start sector logic, that selects one of the plurality of start sectors; and disk drive logic, coupled to the cache disk drive and the cache write logic, that controls cache read and write operations to the cache disk drive;

wherein the disk drive logic, during a cache write operation, writes cache data to a write section beginning at a start sector selected by the select logic.

2. A disk drive caching system, comprising:

a disk drive;

cache write logic, coupled to the disk drive, comprising:
start sector logic that determines a plurality of start sectors including an offset sector relative to a current sector within a current track of the disk drive and at least one other sector that corresponds to the offset sector; and select logic, coupled to the start sector logic, that selects one of the plurality of start sectors; and disk drive logic, coupled to the disk drive and the cache write logic, that controls cache read and write operations to the disk drive;

wherein the disk drive logic, during a cache write operation, writes cache data to a write section beginning at a start sector selected by the select logic;

the disk drive being divided into zones each having a different sector density; and an offset table, comprising:
a predetermined sector offset for each zone of the disk drive, the predetermined sector offset associated with a minimal write access time for a corresponding zone; and a predetermined sector step offset for each zone of the disk drive, the predetermined sector step offset associated with sector density of a corresponding zone;

wherein the start sector logic retrieves a sector offset and a sector step offset from the offset table for a current zone to determine the offset sector and at least one alternative start sector.

3. The disk drive caching system of claim 2, further comprising:

the disk drive having a plurality of platters and corresponding write surfaces; and wherein the start sector logic is adapted to use uses the retrieved sector step offset and the determined offset sector to determine a plurality of aligned sectors in aligned tracks of a current cylinder of the disk drive.

4. A disk drive caching system, comprising:

a disk drive;

cache write logic, coupled to the disk drive, comprising:
start sector logic that determines a plurality of start sectors including an offset sector relative to a current sector within a current track of the disk drive and at least one other sector that corresponds to the offset sector; and select logic, coupled to the start sector logic, that selects one of the plurality of start sectors; and disk drive logic, coupled to the disk drive and the cache write logic, that controls cache read and write operations to the disk drive;

wherein the disk drive logic, during a cache write operation, writes cache data to a write section beginning at a start sector selected by the select logic, wherein the select logic includes timing logic that determines a total write time for the cache write operation for each of the plurality of start sectors.

5. The disk drive caching system of claim 4, further comprising:

a write time penalty table including write time penalties associated with the disk drive; and the select logic to retrieve and add any write time penalties from the write time penalty table associated with the cache write operation for each of the plurality of start sectors.

6. The disk drive caching system of claim 4, wherein the select logic is adapted to select one of the plurality of start sectors that has a least total write time.

7. A disk drive caching system, comprising:

a disk drive;

cache write logic, coupled to the disk drive, comprising:
start sector logic that determines a plurality of start sectors including an offset sector relative to a current sector within a current track of the disk drive and at least one other sector that corresponds to the offset sector; and select logic, coupled to the start sector logic, that selects one of the plurality of start sectors; and disk drive logic, coupled to the disk drive and the cache write logic, that controls cache read and write operations to the disk drive;

wherein the disk drive logic, during a cache write operation, writes cache data to a write section beginning at a start sector selected by the select logic, wherein the select logic includes priority logic that determines a priority level of data stored on the disk drive for each of the plurality of start sectors.

8. The disk drive caching system of claim 7, further comprising:

the select logic to determine a write section for each of the plurality of start sectors;

the priority logic to determine a priority level for each sector of each write section; and the select logic to assign a priority level for each write section that is equal to the priority level of a sector having a highest relative priority level within each write section.

9. The disk drive caching system of claim 7, wherein the select logic is adapted to select a start sector associated with the lowest relative priority level.

10. The disk drive caching system of claim 7, further comprising:

the select logic including timing logic that determines a total write time for the cache write operation for each of the plurality of start sectors; and the select logic to select a start sector based on total write time and relative priority level.

11. A data retrieval system for accessing data from an external network, comprising:

a local network system, for coupling to the external network, that enables retrieval of data from the external network;

at least one computer, coupled to the local network system, that requests data from the external network via the local network system; and a server system, coupled to the local network system, comprising:
a disk drive;
a processor coupled to the disk drive;
memory coupled to the disk drive and the processor;
start sector code, stored in the memory and executed by the processor, that determines a plurality of potential start sectors including a first start sector having a minimal write access time and at least one other start sector having a minimal write access time that corresponds with the first start sector;
select code, stored in the memory and executed by the processor, that selects a start sector from the plurality of potential start sectors; and
disk drive code, stored in the memory and executed by the processor, that caches retrieved data onto the disk drive at the selected start sector.

12. The data retrieval system of claim 11, wherein the local network system further comprises:
a gateway device; and
a multiple port network device coupled to the gateway device.

13. The data retrieval system of claim 11, wherein the start sector code, the select code, and the disk drive code are part of an operating system that runs on the server system.

14. The data retrieval system of claim 11, further comprising:
a sector offset table stored in the memory; and
wherein the start sector code accesses the sector offset table to retrieve a sector offset and a sector step offset to determine the plurality of potential start sectors.

15. The data retrieval system of claim 11, wherein the select code selects a start sector based on total write time to store the retrieved data for each of the plurality of potential start sectors.

16. The data retrieval system of claim 15, further comprising:
write delay information stored in the memory; and
wherein the select code accesses and uses the write delay information to determine total write time to store the retrieved data from each of the plurality of potential start sectors.

17. The data retrieval system of claim 11, wherein the select code selects a start sector based on priority of data currently stored on the disk drive beginning at each of the plurality of potential start sectors.

18. The data retrieval system of claim 11, wherein the select code selects a start sector based on a combination of total write time to store the retrieved data and priority of data currently stored on the disk drive beginning at each of the plurality of potential start sectors.

19. The data retrieval system of claim 11, wherein the external network includes the internet and wherein the retrieved data includes web page information from the internet.

20. The data retrieval system of claim 11, wherein the select code selects one of the plurality of potential start sectors based on at least one of a total write time for a cache write operation for each of the plurality of potential start sectors, and a priority level of data stored on the disk drive for each of the plurality of potential start sectors.

21. The data retrieval system of claim 11, wherein selecting the start sector is performed for a cache write operation, and wherein the start sector code determines the plurality of potential start sectors relative to a current sector from which a cache read operation occurred, the plurality of start sectors each associated with about a same delay between the cache read operation and the cache write operation.

22. A method of caching data to a cache disk drive used as a cache, the cache disk drive including a plurality of cylinders, each cylinder including a plurality of corresponding tracks, the method comprising:
determining an offset sector in a current track of the cache disk drive;
determining at least one other sector in a different track of the current cylinder that corresponds to the offset sector, the offset sector and the at least one other sector comprising a plurality of start sectors;
selecting a start sector from the plurality of start sectors for a cache write operation; and
writing cache data to the cache disk drive beginning with the selected start sector.

23. The method of claim 22, wherein the determining an offset sector in a current track of the cache disk drive comprises:
retrieving a sector offset from a table of sector offsets of the cache disk drive; and
adding the retrieved sector offset to a current sector number to obtain an offset sector number.

24. The method of claim 23, wherein the determining at least one other sector in a different track of the current cylinder that corresponds to the offset sector comprises:
retrieving at least one sector step offset from the table of sector offsets of the disk drive; and
adding the at least one retrieved sector step offset to the offset sector number.

25. The method of claim 23, wherein the determining at least one other sector in a different track of the current cylinder that corresponds to the offset sector comprises:
retrieving a plurality of sector step offsets from the table of sector offsets of the cache disk drive; and
adding each retrieved sector step offset to the offset sector number to obtain the plurality of start sectors.

26. The method of claim 22, wherein the writing cache data to the cache disk drive further comprises:
determining a priority level of the cache data to be written; and
storing a number corresponding to the determined priority level in a file database.

27. A method of caching data to a disk drive, the disk drive including a plurality of cylinders, each cylinder including a plurality of corresponding tracks, the method comprising:
determining an offset sector in a current track of the disk drive;
determining at least one other sector in a different track of the current cylinder that corresponds to the offset sector, the offset sector and the at least one other sector comprising a plurality of start sectors;
selecting a start sector from the plurality of start sectors for a cache write operation; and
writing cache data to the disk drive beginning with the selected start sector,
wherein the determining an offset sector in a current track of the disk drive comprises determining a sector having a minimum write access time after a read operation.

28. A method of caching data to a disk drive, the disk drive including a plurality of cylinders, each cylinder including a plurality of corresponding tracks, the method comprising:
determining an offset sector in a current track of the disk drive;

determining at least one other sector in a different track of the current cylinder that corresponds to the offset sector, the offset sector and the at least one other sector comprising a plurality of start sectors;

selecting a start sector from the plurality of start sectors for a cache write operation; and writing cache data to the disk drive beginning with the selected start sector, wherein the determining at least one other sector in a different track of the current cylinder that corresponds to the offset sector comprises determining aligned sectors in aligned tracks along the current cylinder of the disk drive.

29. A method of caching data to a disk drive, the disk drive including a plurality of cylinders, each cylinder including a plurality of corresponding tracks, the method comprising:

determining an offset sector in a current track of the disk drive;

determining at least one other sector in a different track of the current cylinder that corresponds to the offset sector, the offset sector and the at least one other sector comprising a plurality of start sectors;

selecting a start sector from the plurality of start sectors for a cache write operation; and writing cache data to the disk drive beginning with the selected start sector, wherein the selecting a start sector further comprises:
determining a total write time associated with each of the plurality of start sectors.

30. The method of claim 29, wherein the selecting a start sector further comprises:

determining a priority level associated with each of the plurality of start sectors; and selecting a start sector from the plurality of start sectors using total write time and relative priority level of each of the plurality of start sectors.

31. The method of claim 29, wherein the selecting a start sector further comprises:

selecting a start sector having a least total write time.

32. The method of claim 29, wherein the determining a total write time associated with each of the plurality of start sectors further comprises adding any write time delays associated with each of the plurality of start sectors.

33. The method of claim 32, further comprising:

consulting a table of predetermined write time delays of the disk drive.

34. A method of caching data to a disk drive, the disk drive including a plurality of cylinders, each cylinder including a plurality of corresponding tracks, the method comprising:

determining an offset sector in a current track of the disk drive;

determining at least one other sector in a different track of the current cylinder that corresponds to the offset sector, the offset sector and the at least one other sector comprising a plurality of start sectors;

selecting a start sector from the plurality of start sectors for a cache write operation; and writing cache data to the disk drive beginning with the selected start sector, wherein the selecting a start sector further comprises:
determining a priority level associated with each of the plurality of start sectors.

35. The method of claim 34, wherein the determining a priority level associated with each of the plurality of start sectors comprises:

determining a plurality of write sections corresponding to the plurality of start sectors;

determining a priority level of each sector within each of the plurality of write sections; and assigning a priority level to each of the plurality of write sections as being equal to the priority level of an included sector having a highest priority level.

36. The method of claim 34, wherein the selecting a start sector further comprises:

selecting a start sector associated with a lowest priority level.

37. A disk drive caching system, comprising:

a disk drive;

cache write logic, coupled to the disk drive, comprising:
start sector logic that determines a plurality of start sectors including an offset sector relative to a current sector within a current track of the disk drive and at least one other sector that corresponds to the offset sector; and select logic, coupled to the start sector logic, that selects one of the plurality of start sectors; and disk drive logic, coupled to the disk drive and the cache write logic, that controls cache read and write operations to the disk drive;

wherein the disk drive logic, during a cache write operation, writes cache data to a write section beginning at a start sector selected by the select logic, wherein the select logic is adapted to select one of the plurality of start sectors based on at least one of a total write time for the cache write operation for each of the plurality of start sectors, and a priority level of data stored on the disk drive for each of the plurality of start sectors.

38. A disk drive caching system, comprising:

a disk drive;

cache write logic, coupled to the disk drive, comprising:
start sector logic that determines a plurality of start sectors including an offset sector relative to a current sector within a current track of the disk drive and at least one other sector that corresponds to the offset sector; and select logic, coupled to the start sector logic, that selects one of the plurality of start sectors; and disk drive logic, coupled to the disk drive and the cache write logic, that controls cache read and write operations to the disk drive;

wherein the disk drive logic, during a cache write operation, writes cache data to a write section beginning at a start sector selected by the select logic, wherein the start sector logic is adapted to determine the plurality of start sectors relative to a current sector from which a cache read operation occurred, the plurality of start sectors each associated with about a same delay between the cache read operation and the cache write operation.

39. The disk drive caching system of claim 38, further comprising plural platters, the plurality of start sectors distributed across the platters.

40. A method of caching data to a disk drive, the disk drive including a plurality of cylinders, each cylinder including a plurality of corresponding tracks, the method comprising:
  determining an offset sector in a current track of the disk drive;
  determining at least one other sector in a different track of the current cylinder that corresponds to the offset sector, the offset sector and the at least one other sector comprising a plurality of start sectors;
  selecting a start sector from the plurality of start sectors for a cache write operation; and
  writing cache data to the disk drive beginning with the selected start sector,
  wherein selecting the start sector from the plurality of start sectors is based on at least one of a total write time associated with each of the plurality of start sectors, and a priority level associated with each of the plurality of start sectors.

* * * * *